US012350233B2

(12) United States Patent
Fister

(10) Patent No.: US 12,350,233 B2
(45) Date of Patent: Jul. 8, 2025

(54) MEDICAL FLUID COMPOUNDING SYSTEMS WITH COORDINATED FLOW CONTROL

(71) Applicant: ICU Medical, Inc., San Clemente, CA (US)

(72) Inventor: Philipp Marc Fister, Berlin (DE)

(73) Assignee: ICU Medical, Inc., San Clemente, CA (US)

(*) Notice: Subject to any disclaimer, the term of this patent is extended or adjusted under 35 U.S.C. 154(b) by 271 days.

(21) Appl. No.: 18/063,537

(22) Filed: Dec. 8, 2022

(65) Prior Publication Data

US 2023/0181419 A1 Jun. 15, 2023

Related U.S. Application Data

(60) Provisional application No. 63/288,491, filed on Dec. 10, 2021.

(51) Int. Cl.
*A61J 1/20* (2006.01)
*A61J 1/22* (2006.01)

(52) U.S. Cl.
CPC ........... *A61J 1/2037* (2015.05); *A61J 1/2089* (2013.01); *A61J 1/22* (2013.01)

(58) Field of Classification Search
CPC ........... A61J 1/22; A61J 1/2089; A61J 1/2037
See application file for complete search history.

(56) References Cited

U.S. PATENT DOCUMENTS 3,401,337 A 9/1968 Beusman et al.
3,484,681 A 12/1969 Grady, Jr. et al.
3,699,320 A 10/1972 Zimmerman et al.
3,727,074 A 4/1973 Keller et al.
(Continued)

FOREIGN PATENT DOCUMENTS

AU 2013216679 9/2013
BR PI0704229-9 11/2009
(Continued)

OTHER PUBLICATIONS

Abbott Laboratories, "LifeCare® 5000, Plum®: Concurrent Flow Infusion System with DataPort™", System Operating Manual, Version 1.6, Jul. 1998, pp. 76.
(Continued)

*Primary Examiner* — Timothy L Maust
(74) *Attorney, Agent, or Firm* — Knobbe, Martens, Olson & Bear, LLP

(57) ABSTRACT

A system for compounding precise amounts of fluid from one or more source containers into at least one target container is described. The fluid can be drawn from the one or more source containers via an intermediate measuring container such as a syringe pump actuated by a stepper motor or other electronic motor. A system controller can use a measured back EMF value of the motor to determine a pressure within a syringe pump, and control the operation of the motor based at least in part on the determined pressure. The determined pressures of a plurality of syringe pumps can be used to optimize the speed at which the syringe pumps dispense fluid from the source containers while avoiding an overpressure condition which can compromise a compounding process and damage one-way valves within the system.

20 Claims, 7 Drawing Sheets

(56) References Cited

U.S. PATENT DOCUMENTS 3,731,679 A 5/1973 Wilhelmson et al.
3,768,084 A 10/1973 Haynes
3,770,354 A 11/1973 Tsuruta et al.
3,778,702 A 12/1973 Finger
3,806,821 A 4/1974 Niemeyer et al.
3,838,565 A 10/1974 Carlyle
3,854,038 A 12/1974 McKinley
3,886,459 A 5/1975 Hufford et al.
3,890,554 A 6/1975 Yoshitake et al.
3,894,431 A 7/1975 Muston et al.
3,898,637 A 8/1975 Wolstenholme
3,901,231 A 8/1975 Olson
3,909,693 A 9/1975 Yoshitake et al.
3,910,701 A 10/1975 Henderson
3,911,343 A 10/1975 Oster
3,919,608 A 11/1975 Usami et al.
3,921,622 A 11/1975 Cole
3,930,404 A 1/1976 Ryden, Jr.
3,933,431 A 1/1976 Trujillo et al.
3,935,876 A 2/1976 Massie et al.
3,944,963 A 3/1976 Hively
3,966,358 A 6/1976 Heimes et al.
3,971,980 A 7/1976 Jungfer et al.
3,974,681 A 8/1976 Namery
3,974,683 A 8/1976 Martin
3,985,467 A 10/1976 Lefferson
3,990,444 A 11/1976 Vial
3,997,888 A 12/1976 Kremer
4,005,724 A 2/1977 Courtot
4,014,206 A 3/1977 Taylor
4,038,982 A 8/1977 Burke
4,039,269 A 8/1977 Pickering
4,048,474 A 9/1977 Olesen
4,049,954 A 9/1977 Da Costa Vieira et al.
4,055,175 A 10/1977 Clemens et al.
4,057,228 A 11/1977 Völker et al.
4,068,521 A 1/1978 Cosentino et al.
4,078,562 A 3/1978 Friedman
4,089,227 A 5/1978 Falgari et al.
4,094,318 A 6/1978 Burke
4,105,028 A 8/1978 Sadlier et al.
4,114,144 A 9/1978 Hyman
4,151,845 A 5/1979 Clemens
4,155,362 A 5/1979 Jess
4,173,224 A 11/1979 Marx
4,181,610 A 1/1980 Shintani et al.
4,183,244 A 1/1980 Kohno et al.
4,195,515 A 4/1980 Smoll
4,210,138 A 7/1980 Jess et al.
4,213,454 A 7/1980 Shim
4,217,993 A 8/1980 Jess et al.
4,240,294 A 12/1980 Grande
4,240,438 A 12/1980 Updike et al.
4,244,365 A 1/1981 McGill
4,256,437 A 3/1981 Brown
4,261,356 A 4/1981 Turner et al.
4,264,861 A 4/1981 Radu et al.
4,265,240 A 5/1981 Jenkins
4,270,532 A 6/1981 Franetzki et al.
4,277,226 A 7/1981 Archibald et al.
4,278,085 A 7/1981 Shim
4,280,495 A 7/1981 Lampert
4,282,872 A 8/1981 Franetzki et al.
4,286,202 A 8/1981 Clancy et al.
4,290,346 A 9/1981 Bujan
4,291,692 A 9/1981 Bowman et al.
4,292,405 A 9/1981 Mascoli
4,298,357 A 11/1981 Permic
4,308,866 A 1/1982 Jeliffe
4,312,341 A 1/1982 Zissimopoulos
4,319,568 A 3/1982 Tregoning
4,322,201 A 3/1982 Archibald
4,323,849 A 4/1982 Smith
4,324,662 A 4/1982 Schnell
4,328,800 A 5/1982 Marx
4,328,801 A 5/1982 Marx
4,333,045 A 6/1982 Oltendorf
4,343,316 A 8/1982 Jespersen
4,344,429 A 8/1982 Gupton et al.
4,346,707 A 8/1982 Whitney et al.
4,360,019 A 11/1982 Portner et al.
4,366,384 A 12/1982 Jensen
4,367,736 A 1/1983 Gupton
4,370,983 A 2/1983 Lichtenstein et al.
4,373,527 A 2/1983 Fischell
4,379,452 A 4/1983 DeVries
4,381,005 A 4/1983 Bujan
4,384,578 A 5/1983 Winkler
4,385,247 A 5/1983 Satomi
4,391,598 A 7/1983 Thompson
4,392,849 A 7/1983 Petre et al.
4,394,862 A 7/1983 Shim
4,395,259 A 7/1983 Prestele et al.
4,397,194 A 8/1983 Soltz
4,399,362 A 8/1983 Cormier et al.
4,407,659 A 10/1983 Adam
4,411,651 A 10/1983 Schulman
4,418,565 A 12/1983 St. John
4,432,699 A 2/1984 Beckman et al.
4,432,761 A 2/1984 Dawe
4,432,762 A 2/1984 Dawe
4,443,218 A 4/1984 Decant, Jr. et al.
4,444,546 A 4/1984 Pazemenas
4,447,191 A 5/1984 Bilstad et al.
4,447,224 A 5/1984 Decant, Jr. et al.
4,453,931 A 6/1984 Pastrone
4,457,751 A 7/1984 Rodler
4,463,301 A 7/1984 Moriguchi et al.
4,464,170 A 8/1984 Clemens
4,467,654 A 8/1984 Murakami et al.
4,468,222 A 8/1984 Lundquist
4,468,601 A 8/1984 Chamran et al.
4,469,481 A 9/1984 Kobayashi
4,475,666 A 10/1984 Bilbrey et al.
4,475,901 A 10/1984 Kraegen et al.
4,477,756 A 10/1984 Moriguchi
4,479,760 A 10/1984 Bilstad et al.
4,480,218 A 10/1984 Hair
4,480,483 A 11/1984 McShane
4,483,202 A 11/1984 Ogua et al.
4,487,601 A 12/1984 Lindemann
4,492,909 A 1/1985 Hartwig
4,496,346 A 1/1985 Mosteller
4,498,843 A 2/1985 Schneider et al.
4,501,531 A 2/1985 Bilstad et al.
4,504,263 A 3/1985 Steuer
4,507,112 A 3/1985 Hillel
4,510,266 A 4/1985 Eertink
4,515,584 A 5/1985 Abe et al.
4,519,792 A 5/1985 Dawe
4,521,212 A 6/1985 Ruschke
4,525,163 A 6/1985 Slavik et al.
4,526,568 A 7/1985 Clemens et al.
4,526,574 A 7/1985 Pekkarinen
4,529,401 A 7/1985 Leslie et al.
4,533,350 A 8/1985 Danby et al.
4,543,955 A 10/1985 Schroeppel
4,551,134 A 11/1985 Slavik et al.
4,553,958 A 11/1985 LeCocq
4,559,036 A 12/1985 Wunsch
4,559,037 A 12/1985 Franetzki et al.
4,559,044 A 12/1985 Robinson
4,559,454 A 12/1985 Kramer
4,565,500 A 1/1986 Jeensalute et al.
4,583,981 A 4/1986 Urquhart et al.
4,587,473 A 5/1986 Turvey
4,607,520 A 8/1986 Dam
4,617,014 A 10/1986 Cannon et al.
4,624,661 A 11/1986 Arimond
4,627,835 A 12/1986 Fenton, Jr.
4,633,878 A 1/1987 Bombardieri
4,634,426 A 1/1987 Kamen
4,634,427 A 1/1987 Hannula et al.
4,636,144 A 1/1987 Abe et al.

(56) References Cited

U.S. PATENT DOCUMENTS

| | | | |
|---|---|---|---|
| 4,637,813 | A | 1/1987 | DeVries |
| 4,645,489 | A | 2/1987 | Krumme |
| 4,648,869 | A | 3/1987 | Bobo, Jr. |
| 4,652,260 | A | 3/1987 | Fenton, Jr. et al. |
| 4,658,244 | A | 4/1987 | Meijer |
| 4,668,216 | A | 5/1987 | Martin |
| 4,668,945 | A | 5/1987 | Aldrovandi et al. |
| 4,673,334 | A | 6/1987 | Allington et al. |
| 4,673,389 | A | 6/1987 | Archibald et al. |
| 4,676,776 | A | 6/1987 | Howson et al. |
| 4,677,359 | A | 6/1987 | Enami et al. |
| 4,678,979 | A | 7/1987 | Hori |
| 4,678,998 | A | 7/1987 | Muramatsu |
| 4,679,562 | A | 7/1987 | Luksha |
| 4,683,428 | A | 7/1987 | Gete |
| 4,685,903 | A | 8/1987 | Cable et al. |
| 4,690,673 | A | 9/1987 | Blomquist |
| 4,691,153 | A | 9/1987 | Nishimura |
| 4,692,145 | A | 9/1987 | Weyant |
| 4,696,671 | A | 9/1987 | Epstein et al. |
| 4,697,129 | A | 9/1987 | Enami et al. |
| 4,702,675 | A | 10/1987 | Aldrovandi et al. |
| 4,705,506 | A | 11/1987 | Archibald et al. |
| 4,710,106 | A | 12/1987 | Iwata et al. |
| 4,714,462 | A | 12/1987 | DiDomenico |
| 4,714,463 | A | 12/1987 | Archibald et al. |
| 4,718,576 | A | 1/1988 | Tamura et al. |
| 4,720,636 | A | 1/1988 | Benner |
| 4,722,224 | A | 2/1988 | Scheller et al. |
| 4,722,734 | A | 2/1988 | Kolin |
| 4,731,051 | A | 3/1988 | Fischell |
| 4,731,057 | A | 3/1988 | Tanaka et al. |
| 4,737,711 | A | 4/1988 | O'Hare |
| 4,739,346 | A | 4/1988 | Buckley |
| 4,741,732 | A | 5/1988 | Crankshaw et al. |
| 4,741,736 | A | 5/1988 | Brown |
| 4,748,857 | A | 6/1988 | Nakagawa |
| 4,751,445 | A | 6/1988 | Sakai |
| 4,756,706 | A | 7/1988 | Kerns et al. |
| 4,758,228 | A | 7/1988 | Williams |
| 4,763,525 | A | 8/1988 | Cobb |
| 4,764,166 | A | 8/1988 | Spani et al. |
| 4,764,697 | A | 8/1988 | Christiaens |
| 4,769,001 | A | 9/1988 | Prince |
| 4,776,842 | A | 10/1988 | Franetzki et al. |
| 4,781,687 | A | 11/1988 | Wall |
| 4,784,576 | A | 11/1988 | Bloom et al. |
| 4,785,184 | A | 11/1988 | Bien et al. |
| 4,785,799 | A | 11/1988 | Schoon et al. |
| 4,785,969 | A | 11/1988 | McLaughlin |
| 4,786,800 | A | 11/1988 | Kamen |
| 4,789,014 | A | 12/1988 | DiGianfilippo |
| 4,797,655 | A | 1/1989 | Orndal et al. |
| 4,803,389 | A | 2/1989 | Ogawa et al. |
| 4,803,625 | A | 2/1989 | Fu et al. |
| 4,818,186 | A | 4/1989 | Pastrone et al. |
| 4,820,281 | A | 4/1989 | Lawler |
| 4,821,558 | A | 4/1989 | Pastrone et al. |
| 4,828,545 | A | 5/1989 | Epstein et al. |
| 4,828,693 | A | 5/1989 | Lindsay |
| 4,829,448 | A | 5/1989 | Balding et al. |
| 4,838,856 | A | 6/1989 | Mulreany et al. |
| 4,838,857 | A | 6/1989 | Strowe et al. |
| 4,840,542 | A | 6/1989 | Abbott |
| 4,842,584 | A | 6/1989 | Pastrone et al. |
| 4,845,487 | A | 7/1989 | Frantz et al. |
| 4,846,792 | A | 7/1989 | Bobo et al. |
| 4,850,805 | A | 7/1989 | Madsen et al. |
| 4,851,755 | A | 7/1989 | Fincher |
| 4,854,324 | A | 8/1989 | Hirschman et al. |
| 4,856,339 | A | 8/1989 | Williams |
| 4,857,048 | A | 8/1989 | Simons et al. |
| 4,857,050 | A | 8/1989 | Lentz et al. |
| 4,858,154 | A | 8/1989 | Anderson et al. |
| 4,863,425 | A | 9/1989 | Slate et al. |
| 4,865,584 | A | 9/1989 | Epstein et al. |
| 4,869,722 | A | 9/1989 | Heyman |
| 4,874,359 | A | 10/1989 | White et al. |
| 4,881,413 | A | 11/1989 | Georgi et al. |
| 4,882,575 | A | 11/1989 | Kawahara |
| 4,884,013 | A | 11/1989 | Jackson et al. |
| 4,884,065 | A | 11/1989 | Crouse et al. |
| 4,886,422 | A | 12/1989 | Takeuchi et al. |
| 4,898,576 | A | 2/1990 | Philip |
| 4,898,578 | A | 2/1990 | Rubalcaba, Jr. |
| 4,906,103 | A | 3/1990 | Kao |
| 4,908,017 | A | 3/1990 | Howson et al. |
| 4,908,019 | A | 3/1990 | Urquhart et al. |
| 4,910,475 | A | 3/1990 | Lin |
| 4,919,595 | A | 4/1990 | Likuski et al. |
| 4,919,596 | A | 4/1990 | Slate et al. |
| 4,925,444 | A | 5/1990 | Orkin et al. |
| 4,927,411 | A | 5/1990 | Pastrone et al. |
| 4,930,358 | A | 6/1990 | Motegi et al. |
| 4,936,820 | A | 6/1990 | Dennehey |
| 4,936,828 | A | 6/1990 | Chiang |
| 4,938,079 | A | 7/1990 | Goldberg |
| 4,943,279 | A | 7/1990 | Samiotes et al. |
| 4,946,439 | A | 8/1990 | Eggers |
| 4,947,856 | A | 8/1990 | Beard |
| 4,950,235 | A | 8/1990 | Slate et al. |
| 4,950,244 | A | 8/1990 | Fellingham |
| 4,959,050 | A | 9/1990 | Bobo, Jr. |
| 4,966,579 | A | 10/1990 | Polaschegg |
| 4,968,941 | A | 11/1990 | Rogers |
| 4,972,842 | A | 11/1990 | Korten et al. |
| 4,976,687 | A | 12/1990 | Martin |
| 4,978,335 | A | 12/1990 | Arthur, III |
| 4,979,940 | A | 12/1990 | Lapp et al. |
| 4,981,467 | A | 1/1991 | Bobo et al. |
| 5,000,663 | A | 3/1991 | Gorton |
| 5,000,739 | A | 3/1991 | Kulisz et al. |
| 5,006,050 | A | 4/1991 | Cooke et al. |
| 5,010,473 | A | 4/1991 | Jacobs |
| 5,014,714 | A | 5/1991 | Millay et al. |
| 5,014,798 | A | 5/1991 | Glynn |
| 5,018,945 | A | 5/1991 | D'Silva |
| 5,026,348 | A | 6/1991 | Venegas |
| 5,028,857 | A | 7/1991 | Taghezout |
| 5,032,112 | A | 7/1991 | Fairchild et al. |
| 5,034,004 | A | 7/1991 | Crankshaw |
| 5,035,143 | A | 7/1991 | Latimer et al. |
| 5,040,699 | A | 8/1991 | Gangemi |
| 5,041,086 | A | 8/1991 | Koenig et al. |
| 5,043,706 | A | 8/1991 | Oliver |
| 5,045,069 | A | 9/1991 | Imparato |
| 5,049,047 | A | 9/1991 | Polaschegg et al. |
| 5,052,230 | A | 10/1991 | Lang |
| 5,053,747 | A | 10/1991 | Slate et al. |
| 5,055,761 | A | 10/1991 | Mills |
| 5,056,992 | A | 10/1991 | Simons |
| 5,058,161 | A | 10/1991 | Weiss |
| 5,059,171 | A | 10/1991 | Bridge |
| 5,063,603 | A | 11/1991 | Burt |
| 5,064,412 | A | 11/1991 | Henke et al. |
| 5,078,683 | A | 1/1992 | Sancoff et al. |
| 5,084,663 | A | 1/1992 | Olsson |
| 5,084,828 | A | 1/1992 | Kaufman et al. |
| 5,088,981 | A | 2/1992 | Howson et al. |
| 5,096,385 | A | 3/1992 | Georgi et al. |
| 5,097,505 | A | 3/1992 | Weiss |
| 5,100,380 | A | 3/1992 | Epstein et al. |
| 5,102,392 | A | 4/1992 | Sakai et al. |
| 5,103,211 | A | 4/1992 | Daoud et al. |
| 5,104,374 | A | 4/1992 | Bishko et al. |
| 5,108,367 | A | 4/1992 | Epstein et al. |
| 5,109,850 | A | 5/1992 | Blanco et al. |
| 5,116,203 | A | 5/1992 | Nartwick et al. |
| 5,116,312 | A | 5/1992 | Blakenship et al. |
| 5,116,316 | A | 5/1992 | Sertic |
| 5,123,275 | A | 6/1992 | Daoud et al. |
| 5,124,627 | A | 6/1992 | Okada |
| 5,125,499 | A | 6/1992 | Saathoff et al. |
| 5,131,816 | A | 7/1992 | Brown |

(56) References Cited

U.S. PATENT DOCUMENTS

| | | | |
|---|---|---|---|
| 5,132,603 | A | 7/1992 | Yoshimoto |
| 5,153,827 | A | 10/1992 | Coutre et al. |
| 5,158,441 | A | 10/1992 | Aid |
| 5,161,222 | A | 11/1992 | Montejo et al. |
| 5,174,472 | A | 12/1992 | Raque et al. |
| 5,176,631 | A | 1/1993 | Koenig |
| 5,176,646 | A | 1/1993 | Kuroda |
| 5,179,340 | A | 1/1993 | Rogers |
| 5,180,287 | A | 1/1993 | Natwick et al. |
| 5,181,910 | A | 1/1993 | Scanlon |
| 5,186,057 | A | 2/1993 | Everhart |
| 5,188,603 | A | 2/1993 | Vaillancourt |
| 5,190,522 | A | 3/1993 | Wocicki et al. |
| 5,191,795 | A | 3/1993 | Fellingham et al. |
| 5,192,340 | A | 3/1993 | Grant et al. |
| 5,194,796 | A | 3/1993 | Domeki et al. |
| 5,198,776 | A | 3/1993 | Carr |
| 5,200,090 | A | 4/1993 | Ford |
| 5,205,819 | A | 4/1993 | Ross et al. |
| 5,206,522 | A | 4/1993 | Danby et al. |
| 5,207,642 | A | 5/1993 | Orkin et al. |
| 5,211,626 | A | 5/1993 | Frank et al. |
| 5,213,573 | A | 5/1993 | Sorich et al. |
| 5,215,450 | A | 6/1993 | Tamari |
| 5,216,597 | A | 6/1993 | Beckers |
| 5,219,099 | A | 6/1993 | Spence et al. |
| 5,219,327 | A | 6/1993 | Okada |
| 5,221,268 | A | 6/1993 | Barton et al. |
| 5,229,713 | A | 7/1993 | Bullock et al. |
| 5,232,476 | A | 8/1993 | Grant |
| 5,233,571 | A | 8/1993 | Wirtschafter |
| 5,237,309 | A | 8/1993 | Frantz et al. |
| 5,242,406 | A | 9/1993 | Gross et al. |
| 5,242,408 | A | 9/1993 | Jhuboo et al. |
| 5,243,982 | A | 9/1993 | Möstl et al. |
| 5,244,463 | A | 9/1993 | Cordner, Jr. et al. |
| 5,244,568 | A | 9/1993 | Lindsay et al. |
| 5,254,096 | A | 10/1993 | Rondelet et al. |
| 5,256,155 | A | 10/1993 | Yerlikaya et al. |
| 5,256,156 | A | 10/1993 | Kern et al. |
| 5,256,157 | A | 10/1993 | Samiotes et al. |
| 5,260,665 | A | 11/1993 | Goldberg |
| 5,257,206 | A | 12/1993 | Hanson |
| 5,267,980 | A | 12/1993 | Dirr et al. |
| 5,274,316 | A | 12/1993 | Evans et al. |
| 5,276,610 | A | 1/1994 | Maeda et al. |
| 5,280,728 | A | 1/1994 | Sato et al. |
| 5,283,510 | A | 2/1994 | Tamaki et al. |
| 5,287,851 | A | 2/1994 | Beran et al. |
| 5,292,306 | A | 3/1994 | Wynkoop et al. |
| 5,295,967 | A | 3/1994 | Rondelet et al. |
| 5,298,021 | A | 3/1994 | Sherer |
| 5,303,585 | A | 4/1994 | Lichte |
| 5,304,126 | A | 4/1994 | Epstein et al. |
| 5,304,216 | A | 4/1994 | Wallace |
| 5,308,333 | A | 5/1994 | Skakoon |
| 5,317,506 | A | 5/1994 | Coutre et al. |
| 5,319,363 | A | 6/1994 | Welch et al. |
| 5,319,979 | A | 6/1994 | Abrahamson |
| 5,321,392 | A | 6/1994 | Skakoon et al. |
| 5,325,170 | A | 6/1994 | Bornhop |
| 5,325,728 | A | 7/1994 | Zimmerman et al. |
| 5,328,460 | A | 7/1994 | Lord et al. |
| 5,330,634 | A | 7/1994 | Wong et al. |
| 5,333,497 | A | 8/1994 | Braend et al. |
| 5,336,051 | A | 8/1994 | Tamari |
| 5,338,157 | A | 8/1994 | Blomquist |
| 5,342,298 | A | 8/1994 | Michaels |
| 5,343,734 | A | 9/1994 | Maeda et al. |
| 5,343,885 | A | 9/1994 | Grant |
| 5,346,466 | A | 9/1994 | Yerlikaya et al. |
| 5,356,378 | A | 10/1994 | Doan et al. |
| 5,359,271 | A | 10/1994 | Husher |
| D352,778 | S | 11/1994 | Irvin et al. |
| 5,364,346 | A | 11/1994 | Schrezenmeir |
| 5,366,346 | A | 11/1994 | Danby |
| 5,368,562 | A | 11/1994 | Blomquist et al. |
| 5,374,865 | A | 12/1994 | Yoshimura et al. |
| 5,376,070 | A | 12/1994 | Purvis et al. |
| 5,378,231 | A | 1/1995 | Johnson et al. |
| 5,382,232 | A | 1/1995 | Hague et al. |
| 5,383,369 | A | 1/1995 | Khuri-Yakub et al. |
| 5,389,071 | A | 2/1995 | Kawahara et al. |
| 5,389,078 | A | 2/1995 | Zalesky et al. |
| 5,392,638 | A | 2/1995 | Kawahara |
| 5,394,732 | A | 3/1995 | Johnson et al. |
| 5,395,320 | A | 3/1995 | Padda et al. |
| 5,399,171 | A | 3/1995 | Bowman et al. |
| 5,406,954 | A | 4/1995 | Tomita |
| 5,408,326 | A | 4/1995 | Priestley |
| 5,415,528 | A | 5/1995 | Ogden et al. |
| 5,417,119 | A | 5/1995 | Smoll |
| 5,417,222 | A | 5/1995 | Dempsey et al. |
| 5,417,395 | A | 5/1995 | Fowler et al. |
| 5,418,443 | A | 5/1995 | Kikuchi |
| 5,421,208 | A | 6/1995 | Packard et al. |
| 5,423,748 | A | 6/1995 | Uhala |
| 5,423,749 | A | 6/1995 | Merte et al. |
| 5,423,759 | A | 6/1995 | Campbell |
| 5,428,284 | A | 6/1995 | Kaneda et al. |
| 5,429,485 | A | 7/1995 | Dodge |
| 5,429,601 | A | 7/1995 | Conley |
| 5,429,602 | A | 7/1995 | Hauser |
| 5,431,627 | A | 7/1995 | Pastrone et al. |
| 5,434,508 | A | 7/1995 | Ishida |
| 5,437,624 | A | 8/1995 | Langley et al. |
| 5,444,316 | A | 8/1995 | Ohya et al. |
| 5,444,378 | A | 8/1995 | Rogers |
| 5,445,621 | A | 8/1995 | Poli et al. |
| 5,450,758 | A | 9/1995 | Smoll |
| 5,451,881 | A | 9/1995 | Finger |
| 5,455,423 | A | 10/1995 | Mount et al. |
| 5,455,851 | A | 10/1995 | Chaco et al. |
| 5,463,906 | A | 11/1995 | Spani et al. |
| 5,464,392 | A | 11/1995 | Epstein et al. |
| 5,465,082 | A | 11/1995 | Chaco |
| 5,469,851 | A | 11/1995 | Lipschutz |
| 5,473,948 | A | 12/1995 | Moss et al. |
| 5,480,294 | A | 1/1996 | Di Perna et al. |
| 5,482,438 | A | 1/1996 | Anderson et al. |
| 5,485,408 | A | 1/1996 | Blomquist |
| 5,486,286 | A | 1/1996 | Peterson et al. |
| 5,489,265 | A | 2/1996 | Montalvo et al. |
| 5,495,566 | A | 2/1996 | Kwatinetz |
| 5,496,273 | A | 3/1996 | Pastrone et al. |
| 5,505,696 | A | 4/1996 | Miki |
| 5,505,828 | A | 4/1996 | Wong et al. |
| 5,507,288 | A | 4/1996 | Bocker et al. |
| 5,507,412 | A | 4/1996 | Ebert et al. |
| 5,520,637 | A | 5/1996 | Pager et al. |
| 5,522,798 | A | 6/1996 | Johnson et al. |
| 5,522,799 | A | 6/1996 | Furukawa |
| 5,527,630 | A | 6/1996 | Nagata |
| 5,533,389 | A | 7/1996 | Kamen et al. |
| 5,537,853 | A | 7/1996 | Finburgh et al. |
| 5,542,040 | A | 7/1996 | Chang et al. |
| 5,545,140 | A | 8/1996 | Conero et al. |
| 5,547,470 | A | 8/1996 | Johnson et al. |
| 5,551,850 | A | 9/1996 | Williamson et al. |
| 5,554,013 | A | 9/1996 | Owens et al. |
| 5,554,115 | A | 9/1996 | Thomas et al. |
| 5,558,638 | A | 9/1996 | Evers et al. |
| 5,562,615 | A | 10/1996 | Nassif |
| 5,563,486 | A | 10/1996 | Yamamoto et al. |
| 5,572,105 | A | 11/1996 | Nojima et al. |
| 5,573,502 | A | 11/1996 | LeCocq et al. |
| 5,583,280 | A | 12/1996 | Mo et al. |
| 5,584,667 | A | 12/1996 | Davis |
| 5,584,806 | A | 12/1996 | Amano |
| 5,586,868 | A | 12/1996 | Lawless et al. |
| 5,590,653 | A | 1/1997 | Aida et al. |
| 5,594,786 | A | 1/1997 | Chaco et al. |
| 5,600,073 | A | 2/1997 | Hill |
| 5,601,420 | A | 2/1997 | Warner et al. |

(56) References Cited

U.S. PATENT DOCUMENTS

| | | | |
|---|---|---|---|
| 5,609,575 | A | 3/1997 | Larson et al. |
| 5,609,576 | A | 3/1997 | Voss |
| 5,611,784 | A | 3/1997 | Barresi et al. |
| 5,616,124 | A | 4/1997 | Hague et al. |
| 5,620,312 | A | 4/1997 | Hyman et al. |
| 5,620,608 | A | 4/1997 | Rosa et al. |
| 5,626,140 | A | 5/1997 | Feldman et al. |
| 5,626,151 | A | 5/1997 | Linden |
| 5,626,563 | A | 5/1997 | Dodge et al. |
| 5,627,443 | A | 5/1997 | Kimura et al. |
| 5,628,309 | A | 5/1997 | Brown |
| 5,628,731 | A | 5/1997 | Dodge et al. |
| 5,630,710 | A | 5/1997 | Tune et al. |
| 5,634,896 | A | 6/1997 | Bryant et al. |
| 5,637,095 | A | 6/1997 | Nason et al. |
| 5,640,075 | A | 6/1997 | Brasseur et al. |
| 5,640,150 | A | 6/1997 | Atwater |
| 5,643,212 | A | 7/1997 | Coutre et al. |
| 5,648,710 | A | 7/1997 | Ikeda |
| 5,649,536 | A | 7/1997 | Ogura et al. |
| 5,651,775 | A | 7/1997 | Walker et al. |
| 5,657,000 | A | 8/1997 | Ellingboe |
| 5,658,133 | A | 8/1997 | Anderson et al. |
| 5,658,250 | A | 8/1997 | Blomquist et al. |
| 5,659,234 | A | 8/1997 | Cresens |
| 5,661,245 | A | 8/1997 | Svoboda et al. |
| 5,662,612 | A | 9/1997 | Niehoff |
| 5,665,065 | A | 9/1997 | Colman et al. |
| 5,669,877 | A | 9/1997 | Blomquist |
| 5,672,154 | A | 9/1997 | Sillén et al. |
| 5,672,832 | A | 9/1997 | Cucci et al. |
| 5,681,285 | A | 10/1997 | Ford et al. |
| 5,681,286 | A | 10/1997 | Niehoff |
| 5,685,844 | A | 11/1997 | Marttila |
| 5,685,866 | A | 11/1997 | Lopez |
| 5,687,717 | A | 11/1997 | Halpern et al. |
| 5,689,229 | A | 11/1997 | Chaco et al. |
| 5,691,613 | A | 11/1997 | Gutwillinger |
| 5,695,464 | A | 12/1997 | Viallet |
| 5,695,473 | A | 12/1997 | Olsen |
| 5,697,899 | A | 12/1997 | Hillman et al. |
| 5,697,916 | A | 12/1997 | Schraga |
| 5,712,795 | A | 1/1998 | Layman et al. |
| 5,713,856 | A | 2/1998 | Eggers et al. |
| 5,714,691 | A | 2/1998 | Hill |
| 5,718,562 | A | 2/1998 | Lawless et al. |
| 5,718,569 | A | 2/1998 | Holst |
| 5,720,721 | A | 2/1998 | Dumas et al. |
| 5,722,417 | A | 3/1998 | Rudolph |
| 5,728,074 | A | 3/1998 | Castellano et al. |
| 5,728,948 | A | 3/1998 | Bignell et al. |
| 5,733,257 | A | 3/1998 | Stemby |
| 5,733,259 | A | 3/1998 | Valcke et al. |
| 5,734,464 | A | 3/1998 | Gibbs |
| 5,738,659 | A | 4/1998 | Neer et al. |
| 5,743,856 | A | 4/1998 | Oka et al. |
| 5,744,027 | A | 4/1998 | Connell et al. |
| 5,744,929 | A | 4/1998 | Miyazaki |
| 5,745,378 | A | 4/1998 | Barker et al. |
| 5,752,813 | A | 5/1998 | Tyner et al. |
| 5,752,918 | A | 5/1998 | Fowler et al. |
| 5,752,919 | A | 5/1998 | Schrimpf |
| 5,755,691 | A | 5/1998 | Hilborne |
| 5,758,643 | A | 6/1998 | Wong et al. |
| 5,761,072 | A | 6/1998 | Bardsley, Jr. et al. |
| 5,764,034 | A | 6/1998 | Bowman et al. |
| 5,766,155 | A | 6/1998 | Hyman et al. |
| 5,772,635 | A | 6/1998 | Dastur et al. |
| 5,778,256 | A | 7/1998 | Darbee |
| 5,781,442 | A | 7/1998 | Engleson et al. |
| 5,782,805 | A | 7/1998 | Meinzer et al. |
| 5,788,669 | A | 8/1998 | Peterson |
| 5,788,674 | A | 8/1998 | McWilliams |
| 5,789,923 | A | 8/1998 | Shimoyama et al. |
| 5,792,069 | A | 8/1998 | Greenwald et al. |
| 5,793,211 | A | 8/1998 | Shimoyama et al. |
| 5,795,327 | A | 8/1998 | Wilson et al. |
| 5,798,934 | A | 8/1998 | Saigo et al. |
| 5,800,387 | A | 9/1998 | Duffy et al. |
| 5,803,712 | A | 9/1998 | Davis et al. |
| 5,803,917 | A | 9/1998 | Butterfield |
| 5,805,455 | A | 9/1998 | Lipps |
| 5,807,322 | A | 9/1998 | Lindsey et al. |
| 5,810,770 | A | 9/1998 | Chin et al. |
| 5,813,972 | A | 9/1998 | Nazarian et al. |
| 5,814,004 | A | 9/1998 | Tamari |
| 5,814,015 | A | 9/1998 | Gargano et al. |
| 5,816,779 | A | 10/1998 | Lawless et al. |
| 5,822,715 | A | 10/1998 | Worthington et al. |
| 5,827,179 | A | 10/1998 | Lichter et al. |
| 5,827,223 | A | 10/1998 | Butterfield |
| 5,832,448 | A | 11/1998 | Brown |
| 5,836,910 | A | 11/1998 | Duffy et al. |
| 5,841,261 | A | 11/1998 | Nojima et al. |
| 5,841,284 | A | 11/1998 | Takahashi |
| 5,843,035 | A | 12/1998 | Bowman |
| 5,848,971 | A | 12/1998 | Fowler et al. |
| 5,850,344 | A | 12/1998 | Conkright |
| 5,857,843 | A | 1/1999 | Leason et al. |
| 5,864,330 | A | 1/1999 | Haynes |
| 5,865,805 | A | 2/1999 | Ziemba |
| 5,867,821 | A | 2/1999 | Ballantyne et al. |
| 5,871,465 | A | 2/1999 | Vasko |
| 5,872,453 | A | 2/1999 | Shimoyama et al. |
| 5,875,195 | A | 2/1999 | Dixon |
| 5,882,300 | A | 3/1999 | Malinouskas et al. |
| 5,882,339 | A | 3/1999 | Beiser et al. |
| 5,885,245 | A | 3/1999 | Lynch et al. |
| 5,889,379 | A | 3/1999 | Yanagi et al. |
| 5,891,051 | A | 4/1999 | Han et al. |
| 5,894,209 | A | 4/1999 | Takagi et al. |
| 5,897,493 | A | 4/1999 | Brown |
| 5,897,498 | A | 4/1999 | Canfield, II et al. |
| 5,898,292 | A | 4/1999 | Takemoto et al. |
| 5,899,665 | A | 5/1999 | Makino et al. |
| 5,901,150 | A | 5/1999 | Jhuboo et al. |
| 5,904,666 | A | 5/1999 | DeDecker et al. |
| 5,904,668 | A | 5/1999 | Hyman et al. |
| 5,905,207 | A | 5/1999 | Schalk |
| 5,906,598 | A | 5/1999 | Giesier |
| 5,910,252 | A | 6/1999 | Truitt et al. |
| 5,915,240 | A | 6/1999 | Karpf |
| 5,920,263 | A | 7/1999 | Huttenhoff et al. |
| 5,923,159 | A | 7/1999 | Ezell |
| 5,924,074 | A | 7/1999 | Evans |
| 5,927,349 | A | 7/1999 | Martucci |
| 5,932,119 | A | 8/1999 | Kaplan et al. |
| 5,932,987 | A | 8/1999 | McLoughlin |
| 5,935,099 | A | 8/1999 | Peterson et al. |
| 5,935,106 | A | 8/1999 | Olsen |
| 5,938,634 | A | 8/1999 | Packard |
| 5,938,636 | A | 8/1999 | Kramer et al. |
| 5,941,846 | A | 8/1999 | Duffy et al. |
| 5,944,660 | A | 8/1999 | Kimball et al. |
| 5,947,911 | A | 9/1999 | Wong et al. |
| 5,954,527 | A | 9/1999 | Jhuboo et al. |
| 5,954,696 | A | 9/1999 | Ryan et al. |
| 5,956,023 | A | 9/1999 | Lyle et al. |
| 5,956,501 | A | 9/1999 | Brown |
| 5,957,885 | A | 9/1999 | Bollish et al. |
| 5,957,890 | A | 9/1999 | Mann et al. |
| 5,971,594 | A | 10/1999 | Sahai et al. |
| 5,973,497 | A | 10/1999 | Bergk et al. |
| 5,975,081 | A | 11/1999 | Hood et al. |
| 5,989,222 | A | 11/1999 | Cole et al. |
| 5,990,838 | A | 11/1999 | Burns et al. |
| 5,991,525 | A | 11/1999 | Shah et al. |
| 5,993,393 | A | 11/1999 | Ryan et al. |
| 5,994,876 | A | 11/1999 | Canny et al. |
| 5,997,476 | A | 12/1999 | Brown |
| 6,000,828 | A | 12/1999 | Leet |
| 6,003,006 | A | 12/1999 | Colella et al. |
| 6,003,388 | A | 12/1999 | Oeftering |
| 6,012,034 | A | 1/2000 | Hamparian et al. |

(56) References Cited

U.S. PATENT DOCUMENTS 6,017,318 A 1/2000 Gauthier et al.
6,017,493 A 1/2000 Cambron
6,021,392 A 2/2000 Lester et al.
6,023,977 A 2/2000 Langdon et al.
6,024,539 A 2/2000 Blomquist
6,027,441 A 2/2000 Cantu
6,028,412 A 2/2000 Shine et al.
6,032,676 A 3/2000 Moore
6,033,561 A 3/2000 Schoendorfer
6,036,017 A 3/2000 Bayliss, IV
6,068,612 A 5/2000 Bowman
6,068,615 A 5/2000 Brown et al.
6,073,106 A 6/2000 Rozen et al.
6,077,246 A 6/2000 Kullas et al.
6,083,206 A 7/2000 Molko
6,089,104 A 7/2000 Chang
6,104,295 A 8/2000 Gaisser et al.
6,110,152 A 8/2000 Kovelman
6,110,153 A 8/2000 Davis
RE36,871 E 9/2000 Epstein et al.
6,120,459 A 9/2000 Nitzan et al.
6,122,536 A 9/2000 Sun et al.
6,142,008 A 11/2000 Cole et al.
6,150,942 A 11/2000 O'Brien
6,157,914 A 12/2000 Seto et al.
6,158,288 A 12/2000 Smith
6,158,965 A 12/2000 Butterfield et al.
6,159,147 A 12/2000 Lichter et al.
6,159,186 A 12/2000 Wickham et al.
6,164,921 A 12/2000 Moubayed et al.
6,168,561 B1 1/2001 Cantu
6,178,827 B1 1/2001 Feller
6,182,667 B1 2/2001 Hanks et al.
6,186,141 B1 2/2001 Pike et al.
6,189,105 B1 2/2001 Lopes
6,192,752 B1 2/2001 Blaine
6,195,589 B1 2/2001 Ketcham
6,202,711 B1 3/2001 Martucci
6,203,528 B1 3/2001 Deckert
6,208,107 B1 3/2001 Maske et al.
6,212,936 B1 4/2001 Meisberger
6,213,972 B1 4/2001 Butterfield
6,231,320 B1 5/2001 Lawless et al.
6,234,176 B1 5/2001 Domae et al.
6,236,326 B1 5/2001 Murphy et al.
6,237,398 B1 5/2001 Porat et al.
6,241,704 B1 6/2001 Peterson et al.
6,248,067 B1 6/2001 Causey, III et al.
6,250,132 B1 6/2001 Drzewiecki
6,259,355 B1 7/2001 Chaco et al.
6,259,587 B1 7/2001 Sheldon et al.
6,261,065 B1 7/2001 Nayak
6,262,946 B1 7/2001 Khuri-Yakub et al.
6,267,559 B1 7/2001 Mossman et al.
6,267,725 B1 7/2001 Dubberstein et al.
6,269,340 B1 7/2001 Ford et al.
6,270,455 B1 8/2001 Brown
6,271,813 B1 8/2001 Palalau
6,277,072 B1 8/2001 Bardy
6,277,099 B1 8/2001 Strowe et al.
6,280,380 B1 8/2001 Bardy
6,280,391 B1 8/2001 Olson et al.
6,280,408 B1 8/2001 Sipin
6,283,761 B1 9/2001 Joao
6,285,155 B1 9/2001 Maske et al.
6,312,378 B1 11/2001 Bardy
6,322,516 B1 11/2001 Masuda et al.
6,330,351 B1 12/2001 Yasunaga
6,336,053 B1 1/2002 Beatty
6,337,675 B1 1/2002 Toffolo et al.
6,345,539 B1 2/2002 Rawes et al.
6,347,553 B1 2/2002 Morris et al.
6,349,740 B1 2/2002 Cho et al.
6,358,225 B1 3/2002 Butterfield
6,358,387 B1 3/2002 Kopf-Sill et al.
6,362,591 B1 3/2002 Moberg
6,385,505 B1 5/2002 Lipps
6,386,050 B1 5/2002 Yin et al.
6,394,958 B1 5/2002 Bratteli et al.
6,396,583 B1 5/2002 Clare
6,398,760 B1 6/2002 Danby
6,405,076 B1 6/2002 Taylor et al.
6,408,679 B1 6/2002 Kline-Schoder et al.
6,413,238 B1 7/2002 Maget
6,416,291 B1 7/2002 Butterfield et al.
6,418,334 B1 7/2002 Unger et al.
6,418,535 B1 7/2002 Kulakowski et al.
6,445,053 B1 9/2002 Cho
6,456,245 B1 9/2002 Crawford
6,457,346 B1 10/2002 Kline-Schoder et al.
6,463,785 B1 10/2002 Kline-Schoder et al.
6,467,331 B1 10/2002 Kline-Schoder et al.
6,468,242 B1 10/2002 Wilson et al.
6,475,178 B1 11/2002 Krajewski
6,481,980 B1 11/2002 Vandlik
6,482,158 B2 11/2002 Mault
6,482,185 B1 11/2002 Hartmann
6,485,263 B1 11/2002 Bryant et al.
6,485,418 B2 11/2002 Yasushi et al.
6,485,465 B2 11/2002 Moberg et al.
6,487,916 B1 12/2002 Gomm et al.
6,489,896 B1 12/2002 Platt
6,494,694 B2 12/2002 Lawless et al.
6,494,831 B1 12/2002 Koritzinsky
6,497,680 B1 12/2002 Holst et al.
6,503,221 B1 1/2003 Briggs
6,512,944 B1 1/2003 Kovtun et al.
6,516,667 B1 2/2003 Broad et al.
6,517,482 B1 2/2003 Eiden et al.
6,519,569 B1 2/2003 White et al.
6,529,751 B1 3/2003 Van Driel et al.
6,531,708 B1 3/2003 Malmstrom
6,539,315 B1 3/2003 Adams et al.
6,540,672 B1 4/2003 Simonsen et al.
6,544,212 B2 4/2003 Galley et al.
6,544,228 B1 4/2003 Heitmeier
6,558,125 B1 5/2003 Futterknecht
6,558,351 B1 5/2003 Steil et al.
6,562,012 B1 5/2003 Brown et al.
6,564,825 B2 5/2003 Lowery et al.
6,565,509 B1 5/2003 Say et al.
6,568,416 B2 5/2003 Tucker et al.
6,572,542 B1 6/2003 Houben et al.
6,572,545 B2 6/2003 Knobbe et al.
6,572,576 B2 6/2003 Brugger et al.
6,578,422 B2 6/2003 Lam et al.
6,578,435 B2 6/2003 Gould et al.
6,581,117 B1 6/2003 Klein et al.
RE38,189 E 7/2003 Walker et al.
6,585,675 B1 7/2003 O'Mahony et al.
6,589,229 B1 7/2003 Connelly et al.
6,589,792 B1 7/2003 Malachowski
6,599,281 B1 7/2003 Struys et al.
6,599,282 B2 7/2003 Burko
6,602,191 B2 8/2003 Quy
6,605,072 B2 8/2003 Struys et al.
6,606,047 B1 8/2003 Börjesson et al.
6,609,047 B1 8/2003 Lipps
6,615,674 B2 9/2003 Ohnishi
6,616,633 B1 9/2003 Butterfield et al.
6,617,564 B2 9/2003 Ockerse et al.
6,618,916 B1 9/2003 Eberle et al.
6,622,542 B2 9/2003 Derek
6,622,561 B2 9/2003 Lam et al.
D481,121 S 10/2003 Evans
6,629,449 B1 10/2003 Kline-Schoder et al.
6,634,233 B2 10/2003 He
6,640,246 B1 10/2003 Gardy, Jr. et al.
6,641,533 B2 11/2003 Causey, III et al.
6,641,541 B1 11/2003 Lovett et al.
6,648,861 B2 11/2003 Platt et al.
6,652,455 B1 11/2003 Kocher
6,653,937 B2 11/2003 Nelson et al.
6,659,980 B2 12/2003 Moberg et al.

(56) References Cited

U.S. PATENT DOCUMENTS

| | | | |
|---|---|---|---|
| D485,356 | S | 1/2004 | Evans |
| 6,685,668 | B1 | 2/2004 | Cho et al. |
| 6,685,678 | B2 | 2/2004 | Evans et al. |
| 6,689,069 | B2 | 2/2004 | Bratteli et al. |
| 6,689,091 | B2 | 2/2004 | Bui et al. |
| 6,692,241 | B2 | 2/2004 | Watanabe et al. |
| 6,716,004 | B2 | 4/2004 | Vandlik |
| 6,719,535 | B2 | 4/2004 | Rakestraw et al. |
| 6,721,582 | B2 | 4/2004 | Trepagnier et al. |
| 6,722,211 | B1 | 4/2004 | Ciobanu et al. |
| 6,725,200 | B1 | 4/2004 | Rost |
| 6,725,721 | B2 | 4/2004 | Venczel |
| 6,731,989 | B2 | 5/2004 | Engleson et al. |
| 6,732,595 | B2 | 5/2004 | Lynnworth |
| 6,738,052 | B1 | 5/2004 | Manke et al. |
| 6,740,072 | B2 | 5/2004 | Starkweather et al. |
| 6,741,212 | B2 | 5/2004 | Kralovec et al. |
| 6,748,808 | B2 | 6/2004 | Lam et al. |
| 6,749,403 | B2 | 6/2004 | Bryant et al. |
| 6,752,787 | B1 | 6/2004 | Causey, III et al. |
| 6,753,842 | B1 | 6/2004 | Williams et al. |
| 6,759,007 | B1 | 7/2004 | Westberg |
| 6,760,643 | B2 | 7/2004 | Lipps |
| 6,768,920 | B2 | 7/2004 | Lange |
| 6,773,412 | B2 | 8/2004 | O'Mahony |
| 6,780,156 | B2 | 8/2004 | Haueter et al. |
| 6,783,328 | B2 | 8/2004 | Lucke et al. |
| 6,785,573 | B2 | 8/2004 | Kovtun et al. |
| 6,786,885 | B2 | 9/2004 | Hochman et al. |
| 6,789,426 | B2 | 9/2004 | Yaralioglu et al. |
| 6,790,198 | B1 | 9/2004 | White et al. |
| 6,793,625 | B2 | 9/2004 | Cavallaro et al. |
| 6,801,227 | B2 | 10/2004 | Bocionek et al. |
| 6,805,671 | B2 | 10/2004 | Stergiopoulos et al. |
| 6,807,965 | B1 | 10/2004 | Hickle |
| 6,809,653 | B1 | 10/2004 | Mann et al. |
| 6,813,964 | B1 | 11/2004 | Clark et al. |
| 6,814,547 | B2 | 11/2004 | Childers |
| 6,824,528 | B1 | 11/2004 | Faries |
| 6,830,558 | B2 | 12/2004 | Flaherty et al. |
| 6,840,113 | B2 | 1/2005 | Fukumura et al. |
| 6,846,161 | B2 | 1/2005 | Kline |
| 6,852,094 | B2 | 2/2005 | Beck |
| 6,852,104 | B2 | 2/2005 | Blomquist |
| 6,854,338 | B2 | 2/2005 | Khuri-Yakub et al. |
| 6,857,318 | B1 | 2/2005 | Silber et al. |
| 6,869,425 | B2 | 3/2005 | Briggs et al. |
| 6,873,268 | B2 | 3/2005 | Lebel et al. |
| 6,883,376 | B2 | 4/2005 | He |
| 6,885,881 | B2 | 4/2005 | Leonhardt |
| 6,887,216 | B2 | 5/2005 | Hochman et al. |
| 6,898,301 | B2 | 5/2005 | Iwanaga |
| 6,907,361 | B2 | 6/2005 | Molenaar |
| 6,907,792 | B2 | 6/2005 | Ohnishi |
| 6,915,170 | B2 | 7/2005 | Engleson et al. |
| 6,920,795 | B2 | 7/2005 | Bischoff et al. |
| 6,923,763 | B1 | 8/2005 | Kovatchev et al. |
| 6,928,338 | B1 | 8/2005 | Buchser et al. |
| 6,929,619 | B2 | 8/2005 | Fago et al. |
| 6,929,751 | B2 | 8/2005 | Bowman |
| 6,932,114 | B2 | 8/2005 | Sparks |
| 6,932,796 | B2 | 8/2005 | Sage et al. |
| 6,935,192 | B2 | 8/2005 | Sobek et al. |
| 6,936,029 | B2 | 8/2005 | Mann et al. |
| 6,941,005 | B2 | 9/2005 | Lary et al. |
| 6,942,636 | B2 | 9/2005 | Holst et al. |
| 6,945,954 | B2 | 9/2005 | Hochman et al. |
| 6,958,705 | B2 | 10/2005 | Lebel et al. |
| 6,964,204 | B2 | 11/2005 | Clark et al. |
| 6,973,374 | B2 | 12/2005 | Ader |
| 6,974,437 | B2 | 12/2005 | Lebel et al. |
| 6,975,922 | B2 | 12/2005 | Duncan et al. |
| 6,978,779 | B2 | 12/2005 | Haveri et al. |
| 6,979,326 | B2 | 12/2005 | Mann et al. |
| 6,981,960 | B2 | 1/2006 | Cho et al. |
| 6,984,218 | B2 | 1/2006 | Nayak et al. |
| 6,985,768 | B2 | 1/2006 | Hemming et al. |
| 6,985,870 | B2 | 1/2006 | Martucci et al. |
| 6,986,347 | B2 | 1/2006 | Hickle |
| 6,986,753 | B2 | 1/2006 | Bui |
| 6,997,905 | B2 | 2/2006 | Gillespie, Jr. et al. |
| 6,997,920 | B2 | 2/2006 | Mann et al. |
| 7,006,005 | B2 | 2/2006 | Nazarian et al. |
| 7,017,623 | B2 | 3/2006 | Tribble et al. |
| 7,021,148 | B2 | 4/2006 | Kuhn |
| 7,025,743 | B2 | 4/2006 | Mann et al. |
| 7,029,455 | B2 | 4/2006 | Flaherty |
| 7,029,456 | B2 | 4/2006 | Ware et al. |
| 7,059,184 | B2 | 6/2006 | Kanouda et al. |
| 7,060,059 | B2 | 6/2006 | Keith et al. |
| 7,069,793 | B2 | 7/2006 | Ishikawa et al. |
| 7,072,725 | B2 | 7/2006 | Bristol et al. |
| 7,074,209 | B2 | 7/2006 | Evans et al. |
| 7,080,557 | B2 | 7/2006 | Adnan |
| 7,082,843 | B2 | 8/2006 | Clark et al. |
| 7,087,444 | B2 | 8/2006 | Wong et al. |
| 7,092,796 | B2 | 8/2006 | Vanderveen |
| 7,092,797 | B2 | 8/2006 | Gaines et al. |
| 7,093,502 | B2 | 8/2006 | Kupnik et al. |
| 7,096,729 | B2 | 8/2006 | Repko et al. |
| 7,103,419 | B2 | 9/2006 | Engleson et al. |
| 7,104,763 | B2 | 9/2006 | Bouton et al. |
| 7,104,769 | B2 | 9/2006 | Davis |
| 7,108,680 | B2 | 9/2006 | Rohr et al. |
| 7,109,878 | B2 | 9/2006 | Mann et al. |
| 7,115,113 | B2 | 10/2006 | Evans et al. |
| 7,117,041 | B2 | 10/2006 | Engleson et al. |
| 7,137,964 | B2 | 11/2006 | Flaherty |
| 7,141,037 | B2 | 11/2006 | Butterfield et al. |
| 7,152,490 | B1 | 12/2006 | Freund, Jr. et al. |
| 7,154,397 | B2 | 12/2006 | Zerhusen et al. |
| 7,161,488 | B2 | 1/2007 | Frasch |
| 7,162,290 | B1 | 1/2007 | Levin |
| 7,162,927 | B1 | 1/2007 | Selvan et al. |
| 7,171,277 | B2 | 1/2007 | Engleson et al. |
| 7,174,789 | B2 | 2/2007 | Orr et al. |
| 7,185,288 | B2 | 2/2007 | McKeever |
| 7,197,943 | B2 | 4/2007 | Lee et al. |
| 7,201,734 | B2 | 4/2007 | Hickle |
| 7,204,823 | B2 | 4/2007 | Estes et al. |
| 7,206,715 | B2 | 4/2007 | Vanderveen et al. |
| 7,213,009 | B2 | 5/2007 | Pestotnik |
| 7,220,240 | B2 | 5/2007 | Struys et al. |
| 7,229,430 | B2 | 6/2007 | Hickle et al. |
| 7,230,529 | B2 | 6/2007 | Ketcherside |
| 7,232,430 | B2 | 6/2007 | Carlisle |
| 7,238,164 | B2 | 7/2007 | Childers et al. |
| 7,247,154 | B2 | 7/2007 | Hickle |
| 7,253,779 | B2 | 8/2007 | Greer et al. |
| 7,254,425 | B2 | 8/2007 | Lowery et al. |
| 7,258,534 | B2 | 8/2007 | Fathallah et al. |
| 7,267,664 | B2 | 9/2007 | Rizzo |
| 7,267,665 | B2 | 9/2007 | Steil et al. |
| 7,272,529 | B2 | 9/2007 | Hogan et al. |
| 7,278,983 | B2 | 10/2007 | Ireland et al. |
| 7,291,123 | B2 | 11/2007 | Baraldi et al. |
| 7,293,461 | B1 | 11/2007 | Gimdt |
| 7,294,109 | B2 | 11/2007 | Lovett et al. |
| 7,296,482 | B2 | 11/2007 | Schaffer et al. |
| 7,300,418 | B2 | 11/2007 | Zaleski |
| 7,305,883 | B2 | 12/2007 | Khuri-Yakub et al. |
| 7,327,273 | B2 | 2/2008 | Hung et al. |
| 7,338,470 | B2 | 3/2008 | Katz |
| 7,347,836 | B2 | 3/2008 | Peterson et al. |
| 7,347,854 | B2 | 3/2008 | Shelton et al. |
| 7,354,420 | B2 | 4/2008 | Steil et al. |
| 7,356,382 | B2 | 4/2008 | Vanderveen |
| 7,360,999 | B2 | 4/2008 | Nelson et al. |
| 7,364,562 | B2 | 4/2008 | Braig et al. |
| 7,367,942 | B2 | 5/2008 | Grage et al. |
| 7,369,948 | B1 | 5/2008 | Ferenczi et al. |
| 7,384,410 | B2 | 6/2008 | Eggers et al. |
| 7,397,166 | B1 | 7/2008 | Morgan et al. |
| 7,398,183 | B2 | 7/2008 | Holland et al. |

(56) References Cited

U.S. PATENT DOCUMENTS 7,399,277 B2 7/2008 Saidara et al.
7,402,153 B2 7/2008 Steil et al.
7,402,154 B2 7/2008 Mendez
7,407,489 B2 8/2008 Mendez
7,414,534 B1 8/2008 Kroll et al.
7,415,895 B2 8/2008 Kurisaki et al.
7,426,443 B2 9/2008 Simon
7,430,675 B2 9/2008 Lee et al.
7,447,566 B2 11/2008 Knauper et al.
7,447,643 B1 11/2008 Olson
7,452,190 B2 11/2008 Bouton et al.
7,454,314 B2 11/2008 Holland et al.
7,471,994 B2 12/2008 Ford et al.
7,477,997 B2 1/2009 Kaplit
7,482,818 B2 1/2009 Greenwald et al.
7,483,756 B2 1/2009 Engleson et al.
7,490,021 B2 2/2009 Holland et al.
7,491,187 B2 2/2009 Van Den Berghe et al.
7,503,903 B2 3/2009 Carlisle et al.
7,517,332 B2 4/2009 Tonelli et al.
7,523,401 B1 4/2009 Aldridge
7,545,075 B2 6/2009 Huang et al.
7,556,616 B2 7/2009 Fathallah et al.
7,561,986 B2 7/2009 Vanderveen et al.
7,571,024 B2 8/2009 Duncan et al.
7,605,730 B2 10/2009 Tomioka et al.
7,645,258 B2 1/2010 White et al.
7,654,127 B2 2/2010 Krulevitch et al.
7,657,443 B2 2/2010 Crass
7,668,731 B2 2/2010 Martucci et al.
7,678,048 B1 3/2010 Urbano et al.
7,693,697 B2 4/2010 Westenskow et al.
7,699,806 B2 4/2010 Ware et al.
7,705,727 B2 4/2010 Pestotnik
7,766,873 B2 8/2010 Moberg et al.
7,775,126 B2 8/2010 Eckhardt
7,775,127 B2 8/2010 Wade
7,785,284 B2 8/2010 Baralsi et al.
7,785,313 B2 8/2010 Mastrototaro
7,786,909 B2 8/2010 Udupa et al.
7,806,886 B2 10/2010 Kanderian, Jr. et al.
7,826,981 B2 11/2010 Goode, Jr. et al.
7,847,276 B2 12/2010 Carlisle
7,860,583 B2 12/2010 Condurso et al.
7,871,394 B2 1/2011 Halbert et al.
7,876,443 B2 1/2011 Bernacki
7,895,053 B2 2/2011 Holland et al.
7,895,882 B2 3/2011 Carlisle
7,896,834 B2 3/2011 Smisson, III
7,896,842 B2 3/2011 Palmroos et al.
7,905,710 B2 3/2011 Wang et al.
7,933,780 B2 4/2011 de la Huerga
7,945,452 B2 5/2011 Fathallah et al.
7,976,508 B2 7/2011 Hoag
7,981,073 B2 7/2011 Mollstam
7,981,082 B2 7/2011 Wang et al.
7,998,134 B2 8/2011 Fangrow
8,002,736 B2 8/2011 Patrick et al.
8,034,020 B2 10/2011 Dewey
8,038,593 B2 10/2011 Friedman et al.
8,065,161 B2 11/2011 Howard et al.
8,067,760 B2 11/2011 Carlisle
8,075,514 B2 12/2011 Butterfield et al.
8,075,546 B2 12/2011 Carlisle et al.
8,078,983 B2 12/2011 Davis et al.
8,121,857 B2 2/2012 Galasso et al.
8,149,131 B2 4/2012 Blomquist
8,175,668 B1 5/2012 Nabutovsky et al.
8,177,739 B2 5/2012 Cartledge et al.
8,180,440 B2 5/2012 McCombie et al.
8,185,322 B2 5/2012 Schroeder et al.
8,197,444 B1 6/2012 Bazargan et al.
8,219,413 B2 7/2012 Martinez et al.
8,221,395 B2 7/2012 Shelton et al.
8,226,597 B2 7/2012 Jacobson et al.
8,231,578 B2 7/2012 Fathallah et al.
8,234,128 B2 7/2012 Martucci et al.
8,271,106 B2 9/2012 Wehba et al.
8,287,514 B2 10/2012 Miller et al.
8,291,337 B2 10/2012 Gannin et al.
8,313,308 B2 11/2012 Lawless et al.
8,317,698 B2 11/2012 Lowery
8,317,750 B2 11/2012 Ware et al.
8,317,752 B2 11/2012 Cozmi et al.
8,318,094 B1 11/2012 Bayandorian et al.
8,340,792 B2 12/2012 Condurso et al.
8,347,731 B2 1/2013 Genosar
8,359,338 B2 1/2013 Butterfield et al.
8,361,021 B2 1/2013 Wang et al.
8,378,837 B2 2/2013 Wang et al.
8,388,598 B2 3/2013 Steinkogler
8,398,616 B2 3/2013 Budiman
8,403,908 B2 3/2013 Jacobson et al.
8,409,164 B2 4/2013 Fangrow
8,449,524 B2 5/2013 Braig et al.
8,469,942 B2 6/2013 Kow et al.
8,477,307 B1 7/2013 Yufa et al.
8,494,879 B2 7/2013 Davis et al.
8,504,179 B2 8/2013 Blomquist
8,517,990 B2 8/2013 Teel et al.
8,518,021 B2 8/2013 Stewart et al.
8,522,832 B2 9/2013 Lopez et al.
8,523,797 B2 9/2013 Lowery et al.
8,539,812 B2 9/2013 Stringham et al.
8,543,416 B2 9/2013 Palmroos et al.
8,577,692 B2 11/2013 Silkaitis et al.
8,622,990 B2 1/2014 Estes et al.
8,630,722 B2 1/2014 Condurso et al.
8,665,214 B2 3/2014 Forutanpour et al.
8,666,769 B2 3/2014 Butler et al.
8,700,421 B2 4/2014 Feng et al.
8,706,233 B2 4/2014 Su et al.
8,721,584 B2 5/2014 Braithwaite et al.
8,728,020 B2 5/2014 Caleffi et al.
8,758,306 B2 6/2014 Lopez et al.
8,761,906 B2 6/2014 Condurso et al.
8,768,719 B2 7/2014 Wehba et al.
8,771,251 B2 7/2014 Ruchti et al.
8,792,981 B2 7/2014 Yudovsky et al.
8,821,432 B2 9/2014 Unverdorben
8,823,382 B2 9/2014 Rondoni et al.
8,857,269 B2 10/2014 Johnson et al.
8,858,185 B2 10/2014 Johnson et al.
8,905,965 B2 12/2014 Mandro et al.
8,964,185 B1 2/2015 Luo et al.
9,005,150 B2 4/2015 Ware et al.
9,026,370 B2 5/2015 Rubalcaba et al.
9,084,855 B2 7/2015 Ware et al.
9,114,217 B2 8/2015 Sur et al.
9,134,735 B2 9/2015 Lowery et al.
9,134,736 B2 9/2015 Lowery et al.
9,138,526 B2 9/2015 Ware et al.
9,190,010 B2 11/2015 Vik et al.
9,240,002 B2 1/2016 Hume et al.
9,272,089 B2 3/2016 Jacobson et al.
9,316,216 B1 * 4/2016 Cook ...................... F04B 13/02
9,333,291 B2 5/2016 Jacobson et al.
9,381,296 B2 7/2016 Arrizza et al.
9,393,362 B2 7/2016 Cozmi et al.
9,468,718 B2 10/2016 Hung et al.
9,498,583 B2 11/2016 Sur et al.
9,545,475 B2 1/2017 Borges et al.
9,707,341 B2 7/2017 Dumas, III et al.
9,764,087 B2 9/2017 Peterfreund et al.
9,852,265 B1 12/2017 Treacy et al.
9,883,987 B2 * 2/2018 Lopez ...................... B60J 7/141
9,943,269 B2 4/2018 Muhsin et al.
9,995,611 B2 6/2018 Ruchti et al.
10,022,498 B2 7/2018 Ruchti et al.
10,046,112 B2 8/2018 Oruklu et al.
10,089,055 B1 10/2018 Fryman
10,099,009 B1 10/2018 Anderson et al.
10,166,328 B2 1/2019 Oruklu et al.
10,342,917 B2 7/2019 Shubinsky et al.

(56) References Cited

U.S. PATENT DOCUMENTS

| | | | |
|---|---|---|---|
| 10,430,761 | B2 | 10/2019 | Hume et al. |
| 10,463,788 | B2 | 11/2019 | Day |
| 10,549,248 | B2 | 2/2020 | Brown et al. |
| 10,578,474 | B2 | 3/2020 | Ruchti et al. |
| 10,596,316 | B2 | 3/2020 | Dumas, III et al. |
| 10,635,784 | B2 | 4/2020 | Rubalcaba, Jr. et al. |
| 10,656,894 | B2 | 5/2020 | Fryman |
| 10,682,102 | B2 | 6/2020 | Declerck |
| 10,709,885 | B2 | 7/2020 | Janders et al. |
| 10,850,024 | B2 | 12/2020 | Day et al. |
| 10,874,793 | B2 | 12/2020 | Oruklu et al. |
| 11,004,035 | B2 | 5/2021 | Hume et al. |
| D923,050 | S | 6/2021 | Kataoka et al. |
| 11,029,911 | B2 | 6/2021 | Fryman |
| D928,840 | S | 8/2021 | Amit et al. |
| 11,090,431 | B2 | 8/2021 | Dumas, III et al. |
| D931,884 | S | 9/2021 | Bryant et al. |
| 11,135,360 | B1 | 10/2021 | Jacobson et al. |
| 11,246,985 | B2 | 2/2022 | Gylland et al. |
| 11,298,456 | B2 | 4/2022 | Shubinsky et al. |
| 11,324,888 | B2 | 5/2022 | Shubinsky et al. |
| 11,344,668 | B2 | 5/2022 | Sileika et al. |
| 11,344,673 | B2 | 5/2022 | Lindo et al. |
| 11,376,361 | B2 | 7/2022 | Ruchti et al. |
| 11,378,430 | B2 | 7/2022 | Ruchti et al. |
| 11,395,875 | B2 | 7/2022 | Rubalcaba, Jr. et al. |
| 11,433,177 | B2 | 9/2022 | Oruklu et al. |
| 2001/0007636 | A1 | 7/2001 | Butterfield |
| 2001/0014769 | A1 | 8/2001 | Bufe et al. |
| 2001/0015099 | A1 | 8/2001 | Blaine |
| 2001/0016056 | A1 | 8/2001 | Westphal et al. |
| 2001/0032099 | A1 | 10/2001 | Joao |
| 2001/0037060 | A1 | 11/2001 | Thompson et al. |
| 2001/0041869 | A1 | 11/2001 | Causey et al. |
| 2001/0044731 | A1 | 11/2001 | Coffman et al. |
| 2002/0003892 | A1 | 1/2002 | Iwanaga |
| 2002/0007116 | A1 | 1/2002 | Zatezalo et al. |
| 2002/0013545 | A1 | 1/2002 | Soltanpour et al. |
| 2002/0013551 | A1 | 1/2002 | Zaitsu et al. |
| 2002/0015018 | A1 | 2/2002 | Shimazu et al. |
| 2002/0018720 | A1 | 2/2002 | Carlisle et al. |
| 2002/0029776 | A1 | 3/2002 | Blomquist |
| 2002/0031838 | A1 | 3/2002 | Meinhart et al. |
| 2002/0032583 | A1 | 3/2002 | Joao |
| 2002/0040208 | A1 | 4/2002 | Flaherty et al. |
| 2002/0044059 | A1 | 4/2002 | Reeder et al. |
| 2002/0045806 | A1 | 4/2002 | Baker, Jr. et al. |
| 2002/0082728 | A1 | 6/2002 | Mueller et al. |
| 2002/0083771 | A1 | 7/2002 | Khuri-Yakub et al. |
| 2002/0085952 | A1 | 7/2002 | Ellingboe et al. |
| 2002/0087115 | A1 | 7/2002 | Hartlaub |
| 2002/0093641 | A1 | 7/2002 | Ortyn et al. |
| 2002/0095486 | A1 | 7/2002 | Bahl |
| 2002/0099282 | A1 | 7/2002 | Knobbe et al. |
| 2002/0099334 | A1 | 7/2002 | Hanson et al. |
| 2002/0143580 | A1 | 10/2002 | Bristol et al. |
| 2002/0147389 | A1 | 10/2002 | Cavallaro et al. |
| 2002/0152239 | A1 | 10/2002 | Bautista-Lloyd et al. |
| 2002/0168278 | A1 | 11/2002 | Jeon et al. |
| 2002/0173703 | A1 | 11/2002 | Lebel et al. |
| 2002/0183693 | A1 | 12/2002 | Peterson et al. |
| 2003/0009244 | A1 | 1/2003 | Engleson |
| 2003/0013959 | A1 | 1/2003 | Grunwald et al. |
| 2003/0018289 | A1 | 1/2003 | Ng et al. |
| 2003/0018308 | A1 | 1/2003 | Tsai |
| 2003/0025602 | A1 | 2/2003 | Medema et al. |
| 2003/0028082 | A1 | 2/2003 | Thompson |
| 2003/0030001 | A1 | 2/2003 | Cooper et al. |
| 2003/0045840 | A1 | 3/2003 | Burko |
| 2003/0050621 | A1 | 3/2003 | Lebel et al. |
| 2003/0060688 | A1 | 3/2003 | Ciarniello et al. |
| 2003/0060765 | A1 | 3/2003 | Campbell et al. |
| 2003/0065537 | A1 | 4/2003 | Evans |
| 2003/0065589 | A1 | 4/2003 | Giacchetti |
| 2003/0073954 | A1 | 4/2003 | Moberg et al. |
| 2003/0079746 | A1 | 5/2003 | Hickle |
| 2003/0083583 | A1 | 5/2003 | Kovtun et al. |
| 2003/0091442 | A1 | 5/2003 | Bush et al. |
| 2003/0104982 | A1 | 6/2003 | Wittmann et al. |
| 2003/0106553 | A1 | 6/2003 | Vanderveen |
| 2003/0125662 | A1 | 7/2003 | Bui |
| 2003/0130616 | A1 | 7/2003 | Steil |
| 2003/0135087 | A1 | 7/2003 | Hickle et al. |
| 2003/0136193 | A1 | 7/2003 | Fujimoto |
| 2003/0139701 | A1 | 7/2003 | White et al. |
| 2003/0140928 | A1 | 7/2003 | Bui et al. |
| 2003/0141981 | A1 | 7/2003 | Bui et al. |
| 2003/0143746 | A1 | 7/2003 | Sage, Jr. |
| 2003/0144878 | A1 | 7/2003 | Wilkes et al. |
| 2003/0158508 | A1 | 8/2003 | DiGianfilippo |
| 2003/0160683 | A1 | 8/2003 | Blomquist |
| 2003/0163789 | A1 | 8/2003 | Blomquist |
| 2003/0173408 | A1 | 9/2003 | Mosher, Jr. et al. |
| 2003/0186833 | A1 | 10/2003 | Huff et al. |
| 2003/0187338 | A1 | 10/2003 | Say et al. |
| 2003/0200116 | A1 | 10/2003 | Forrester |
| 2003/0204274 | A1 | 10/2003 | Ullestad et al. |
| 2003/0204416 | A1 | 10/2003 | Acharya |
| 2003/0212364 | A1 | 11/2003 | Mann et al. |
| 2003/0212379 | A1 | 11/2003 | Bylund et al. |
| 2003/0216682 | A1 | 11/2003 | Junker |
| 2003/0217962 | A1 | 11/2003 | Childers et al. |
| 2003/0233071 | A1 | 12/2003 | Gillespie, Jr. et al. |
| 2004/0030277 | A1 | 2/2004 | O'Mahony et al. |
| 2004/0047736 | A1 | 3/2004 | Nose et al. |
| 2004/0057226 | A1 | 3/2004 | Berthou et al. |
| 2004/0064342 | A1 | 4/2004 | Browne et al. |
| 2004/0073125 | A1 | 4/2004 | Lovett et al. |
| 2004/0073161 | A1 | 4/2004 | Tachibana |
| 2004/0077996 | A1 | 4/2004 | Jasperson et al. |
| 2004/0082908 | A1 | 4/2004 | Whitehurst |
| 2004/0082918 | A1 | 4/2004 | Evans et al. |
| 2004/0104271 | A1 | 6/2004 | Martucci et al. |
| 2004/0119753 | A1 | 6/2004 | Zencke |
| 2004/0120825 | A1 | 6/2004 | Bouton et al. |
| 2004/0128162 | A1 | 7/2004 | Schlotterbeck et al. |
| 2004/0128163 | A1 | 7/2004 | Goodman et al. |
| 2004/0133166 | A1 | 7/2004 | Moberg et al. |
| 2004/0145114 | A1 | 7/2004 | Ippolito et al. |
| 2004/0147034 | A1 | 7/2004 | Gore et al. |
| 2004/0149823 | A1 | 8/2004 | Aptekar |
| 2004/0152970 | A1 | 8/2004 | Hunter et al. |
| 2004/0158193 | A1 | 8/2004 | Bui et al. |
| 2004/0167464 | A1 | 8/2004 | Ireland et al. |
| 2004/0167465 | A1 | 8/2004 | Kohler |
| 2004/0167804 | A1 | 8/2004 | Simpson |
| 2004/0172222 | A1 | 9/2004 | Simpson et al. |
| 2004/0172283 | A1 | 9/2004 | Vanderveen |
| 2004/0172289 | A1 | 9/2004 | Kozic et al. |
| 2004/0172301 | A1 | 9/2004 | Mihai et al. |
| 2004/0172302 | A1 | 9/2004 | Martucci et al. |
| 2004/0176984 | A1 | 9/2004 | White et al. |
| 2004/0181314 | A1 | 9/2004 | Zaleski |
| 2004/0193025 | A1 | 9/2004 | Steil et al. |
| 2004/0193325 | A1 | 9/2004 | Bonderud |
| 2004/0193328 | A1 | 9/2004 | Butterfield et al. |
| 2004/0204638 | A1 | 10/2004 | Diab et al. |
| 2004/0204673 | A1 | 10/2004 | Flaherty et al. |
| 2004/0220517 | A1 | 11/2004 | Starkweather et al. |
| 2004/0225252 | A1 | 11/2004 | Gillespie et al. |
| 2004/0225409 | A1 | 11/2004 | Duncan et al. |
| 2004/0232219 | A1 | 11/2004 | Fowler |
| 2004/0253123 | A1 | 12/2004 | Xie et al. |
| 2004/0254434 | A1 | 12/2004 | Goodnow et al. |
| 2004/0254513 | A1 | 12/2004 | Shang et al. |
| 2005/0021006 | A1 | 1/2005 | Tonnies |
| 2005/0021297 | A1 | 1/2005 | Hartlaub |
| 2005/0022274 | A1 | 1/2005 | Campbell et al. |
| 2005/0038680 | A1 | 2/2005 | McMahon |
| 2005/0055242 | A1 | 3/2005 | Bello et al. |
| 2005/0055244 | A1 | 3/2005 | Mullan et al. |
| 2005/0065465 | A1 | 3/2005 | Lebel et al. |
| 2005/0075544 | A1 | 4/2005 | Shapiro et al. |
| 2005/0096593 | A1 | 5/2005 | Pope et al. |

(56) References Cited

U.S. PATENT DOCUMENTS

2005/0099624 A1 5/2005 Staehr
2005/0107923 A1 5/2005 Vanderveen
2005/0108057 A1 5/2005 Cohen et al.
2005/0119597 A1 6/2005 O'Mahony et al.
2005/0119914 A1 6/2005 Batch
2005/0131739 A1 6/2005 Rabinowitz et al.
2005/0137522 A1 6/2005 Aoki
2005/0143864 A1 6/2005 Blomquist
2005/0145010 A1 7/2005 Vanderveen et al.
2005/0171503 A1 8/2005 Van Den Berghe et al.
2005/0171815 A1 8/2005 Vanderveen
2005/0177045 A1 8/2005 Degertekin et al.
2005/0177096 A1 8/2005 Bollish et al.
2005/0182306 A1 8/2005 Sloan
2005/0182355 A1 8/2005 Bui
2005/0182366 A1 8/2005 Vogt et al.
2005/0187515 A1 8/2005 Varrichio et al.
2005/0192529 A1 9/2005 Butterfield et al.
2005/0192557 A1 9/2005 Brauker et al.
2005/0197554 A1 9/2005 Polcha
2005/0197621 A1 9/2005 Poulsen et al.
2005/0209563 A1 9/2005 Hopping et al.
2005/0209793 A1 9/2005 Yamada
2005/0224083 A1 10/2005 Crass
2005/0235732 A1 10/2005 Rush
2005/0238506 A1 10/2005 Mescher et al.
2005/0240305 A1 10/2005 Bogash et al.
2005/0273059 A1 12/2005 Mernoe et al.
2005/0277890 A1 12/2005 Stewart et al.
2005/0279419 A1 12/2005 Tribble et al.
2006/0002799 A1 1/2006 Schann et al.
2006/0009727 A1 1/2006 O'Mahony et al.
2006/0009734 A1 1/2006 Martin
2006/0042633 A1 3/2006 Bishop et al.
2006/0047270 A1 3/2006 Shelton
2006/0053036 A1 3/2006 Coffman et al.
2006/0064020 A1 3/2006 Burnes et al.
2006/0064053 A1 3/2006 Bollish et al.
2006/0079768 A1 4/2006 Small et al.
2006/0079831 A1 4/2006 Gilbert
2006/0100746 A1 5/2006 Leibner-Druska
2006/0100907 A1 5/2006 Holland et al.
2006/0106649 A1 5/2006 Eggers et al.
2006/0116639 A1 6/2006 Russell
2006/0117856 A1 6/2006 Orr et al.
2006/0117867 A1 6/2006 Froehlich et al.
2006/0122867 A1 6/2006 Eggers et al.
2006/0135939 A1 6/2006 Brown
2006/0135940 A1 6/2006 Joshi
2006/0136095 A1 6/2006 Rob et al.
2006/0136271 A1 6/2006 Eggers et al.
2006/0140798 A1 6/2006 Kutsuzawa
2006/0143051 A1 6/2006 Eggers et al.
2006/0173260 A1 8/2006 Gaoni et al.
2006/0173406 A1 8/2006 Hayes et al.
2006/0181695 A1 8/2006 Sage, Jr.
2006/0187069 A1 8/2006 Duan
2006/0190302 A1 8/2006 Eggers et al.
2006/0195022 A1 8/2006 Trepagnier et al.
2006/0200007 A1 9/2006 Brockway et al.
2006/0200369 A1 9/2006 Batch et al.
2006/0211404 A1 9/2006 Cromp et al.
2006/0224140 A1 10/2006 Junker
2006/0224141 A1 10/2006 Rush et al.
2006/0224181 A1 10/2006 McEwen et al.
2006/0226088 A1 10/2006 Robinson et al.
2006/0226089 A1 10/2006 Robinson et al.
2006/0226090 A1 10/2006 Robinson et al.
2006/0229918 A1 10/2006 Fotsch et al.
2006/0235353 A1 10/2006 Gelfand et al.
2006/0255149 A1 11/2006 Retter et al.
2006/0258985 A1 11/2006 Russell
2006/0260416 A1 11/2006 Sage et al.
2006/0264895 A1 11/2006 Flanders
2006/0266128 A1 11/2006 Clark et al.
2006/0270971 A1 11/2006 Gelfand et al.
2006/0271286 A1 11/2006 Rosenberg
2006/0272421 A1 12/2006 Frinak et al.
2006/0275142 A1 12/2006 Bouton et al.
2007/0015972 A1 1/2007 Wang et al.
2007/0036511 A1 2/2007 Lundquist et al.
2007/0060796 A1 3/2007 Kim
2007/0060871 A1 3/2007 Istoc
2007/0060872 A1 3/2007 Hall et al.
2007/0060874 A1 3/2007 Nesbitt et al.
2007/0062250 A1 3/2007 Krulevitch et al.
2007/0065363 A1 3/2007 Dalal et al.
2007/0078314 A1 4/2007 Grounsell
2007/0083152 A1 4/2007 Williams, Jr. et al.
2007/0084286 A1 4/2007 Ajay et al.
2007/0084288 A1 4/2007 Thomas et al.
2007/0088271 A1 4/2007 Richards
2007/0088333 A1 4/2007 Levin et al.
2007/0093753 A1 4/2007 Krulevitcvh et al.
2007/0094045 A1 4/2007 Cobbs et al.
2007/0094046 A1 4/2007 Cobbs et al.
2007/0100222 A1 5/2007 Mastrototaro et al.
2007/0100665 A1 5/2007 Brown
2007/0112298 A1 5/2007 Mueller et al.
2007/0118405 A1 5/2007 Campbell et al.
2007/0129618 A1 6/2007 Goldberger et al.
2007/0142822 A1 6/2007 Remde
2007/0156452 A1 7/2007 Batch
2007/0156456 A1 7/2007 McGillin et al.
2007/0179436 A1 8/2007 Braig et al.
2007/0180916 A1 8/2007 Tian et al.
2007/0191817 A1 8/2007 Martin
2007/0197963 A1* 8/2007 Griffiths ............ A61M 5/16827
604/97.01
2007/0214003 A1 9/2007 Holland et al.
2007/0215545 A1 9/2007 Bissler et al.
2007/0233035 A1 10/2007 Wehba et al.
2007/0233049 A1 10/2007 Wehba et al.
2007/0240497 A1 10/2007 Robinson et al.
2007/0250339 A1 10/2007 Mallett et al.
2007/0255250 A1 11/2007 Moberg et al.
2007/0257788 A1 11/2007 Carlson
2007/0267945 A1 11/2007 Sudol
2007/0270747 A1 11/2007 Remde
2007/0274843 A1 11/2007 Vanderveen et al.
2007/0289384 A1 12/2007 Sakai et al.
2008/0009684 A1 1/2008 Corsetti et al.
2008/0028868 A1 2/2008 Konzelmann et al.
2008/0033361 A1 2/2008 Evans et al.
2008/0039777 A1 2/2008 Katz et al.
2008/0048211 A1 2/2008 Khuri-Yakub et al.
2008/0058773 A1 3/2008 John
2008/0060448 A1 3/2008 Wiest et al.
2008/0065420 A1 3/2008 Tirinato et al.
2008/0071210 A1 3/2008 Moubayed et al.
2008/0071496 A1 3/2008 Glascock
2008/0071580 A1 3/2008 Marcus et al.
2008/0077116 A1 3/2008 Dailey et al.
2008/0091466 A1 4/2008 Butler et al.
2008/0097288 A1 4/2008 Levin et al.
2008/0097289 A1 4/2008 Steil et al.
2008/0097317 A1 4/2008 Alholm et al.
2008/0098798 A1 5/2008 Riley et al.
2008/0119822 A1 5/2008 Knauper
2008/0125701 A1 5/2008 Moberg et al.
2008/0139907 A1 6/2008 Rao et al.
2008/0145249 A1 6/2008 Smisson
2008/0169044 A1 7/2008 Osborne et al.
2008/0172030 A1 7/2008 Blomquist et al.
2008/0184784 A1 8/2008 Dam
2008/0188789 A1 8/2008 Galavotti et al.
2008/0188796 A1 8/2008 Steil et al.
2008/0208484 A1 8/2008 Butterfield et al.
2008/0214919 A1 9/2008 Harmon et al.
2008/0221521 A1 9/2008 Getz et al.
2008/0221522 A1 9/2008 Moberg et al.
2008/0262469 A1 10/2008 Bristol et al.
2008/0269663 A1 10/2008 Arnold et al.
2008/0269714 A1 10/2008 Mastrototaro et al.

(56) References Cited

U.S. PATENT DOCUMENTS

2008/0269723 A1 10/2008 Mastrototaro et al.
2008/0275384 A1 11/2008 Mastrototaro et al.
2008/0300572 A1 12/2008 Rankers et al.
2009/0001908 A1 1/2009 Shubinsky et al.
2009/0005703 A1 1/2009 Fasciano
2009/0006061 A1 1/2009 Thukral et al.
2009/0006129 A1 1/2009 Thukral
2009/0006133 A1 1/2009 Weinert
2009/0015824 A1 1/2009 Shubinsky et al.
2009/0043171 A1 2/2009 Rule
2009/0054743 A1 2/2009 Stewart
2009/0054754 A1 2/2009 McMahon et al.
2009/0069743 A1 3/2009 Krishnamoorthy et al.
2009/0077248 A1 3/2009 Castellucci et al.
2009/0082676 A1 3/2009 Bennison
2009/0088731 A1 4/2009 Campbell et al.
2009/0097029 A1 4/2009 Tokhtuev et al.
2009/0099866 A1 4/2009 Newman
2009/0105636 A1 4/2009 Hayter et al.
2009/0112155 A1 4/2009 Zhao
2009/0114037 A1 5/2009 Smith
2009/0119330 A1 5/2009 Sampath et al.
2009/0124963 A1 5/2009 Hogard et al.
2009/0124964 A1 5/2009 Leach et al.
2009/0126825 A1 5/2009 Eliuk et al.
2009/0131861 A1 5/2009 Braig et al.
2009/0135196 A1 5/2009 Holland et al.
2009/0143726 A1 6/2009 Bouton et al.
2009/0144025 A1 6/2009 Bouton et al.
2009/0144026 A1 6/2009 Bouton et al.
2009/0149743 A1 6/2009 Barron et al.
2009/0156922 A1 6/2009 Goldberger et al.
2009/0156975 A1 6/2009 Robinson et al.
2009/0177146 A1 7/2009 Nesbitt et al.
2009/0177188 A1 7/2009 Steinkogler
2009/0177248 A1 7/2009 Roberts
2009/0177769 A1 7/2009 Roberts
2009/0178485 A1 7/2009 Thomas et al.
2009/0183147 A1 7/2009 Davis et al.
2009/0192367 A1 7/2009 Braig et al.
2009/0198347 A1 8/2009 Kirzinger
2009/0205426 A1 8/2009 Balschat et al.
2009/0209938 A1 8/2009 Aalto-Setala
2009/0209945 A1 8/2009 Lobl et al.
2009/0212966 A1 8/2009 Panduro
2009/0221890 A1 9/2009 Saffer et al.
2009/0223294 A1 9/2009 Thomas et al.
2009/0227939 A1 9/2009 Memoe et al.
2009/0264720 A1 10/2009 Torjman et al.
2009/0270810 A1 10/2009 DeBelser
2009/0270833 A1 10/2009 DeBelser
2010/0022988 A1 1/2010 Wochner
2010/0280430 A1 1/2010 Caleffi et al.
2010/0036310 A1 2/2010 Hillman
2010/0056992 A1 3/2010 Hayter
2010/0057042 A1 3/2010 Hayter
2010/0069892 A1 3/2010 Steinbach et al.
2010/0077866 A1 4/2010 Graboi et al.
2010/0079760 A1 4/2010 Bernacki
2010/0094251 A1 4/2010 Estes et al.
2010/0106082 A1 4/2010 Zhou
2010/0114027 A1 5/2010 Jacobson et al.
2010/0121170 A1 5/2010 Rule
2010/0121415 A1 5/2010 Skelton et al.
2010/0130933 A1 5/2010 Holland et al.
2010/0131434 A1 5/2010 Magent et al.
2010/0141460 A1 6/2010 Tokhtuev et al.
2010/0147081 A1 6/2010 Thomas et al.
2010/0152554 A1 6/2010 Steine et al.
2010/0160854 A1 6/2010 Gauthier
2010/0168535 A1 7/2010 Robinson et al.
2010/0177375 A1 7/2010 Seyfried
2010/0185142 A1 7/2010 Kamen et al.
2010/0185182 A1 7/2010 Alme et al.
2010/0198034 A1 8/2010 Thomas et al.
2010/0198182 A1 8/2010 Lanigan et al.
2010/0198183 A1 8/2010 Lanigan et al.
2010/0211002 A1 8/2010 Davis
2010/0212407 A1 8/2010 Stringham et al.
2010/0212675 A1 8/2010 Walling et al.
2010/0217154 A1 8/2010 Deshmukh et al.
2010/0217621 A1 8/2010 Schoenberg
2010/0271218 A1 10/2010 Hoag et al.
2010/0271479 A1 10/2010 Heydlauf
2010/0273738 A1 10/2010 Valcke et al.
2010/0292634 A1 11/2010 Kircher
2010/0295686 A1 11/2010 Sloan et al.
2010/0298765 A1 11/2010 Budiman et al.
2010/0312039 A1 12/2010 Quirico et al.
2010/0317093 A1 12/2010 Turewicz et al.
2010/0317952 A1 12/2010 Budiman et al.
2010/0318025 A1 12/2010 John
2011/0000560 A1 1/2011 Miller et al.
2011/0001605 A1 1/2011 Kiani et al.
2011/0004186 A1 1/2011 Butterfield
2011/0009797 A1 1/2011 Kelly et al.
2011/0028885 A1 2/2011 Eggers et al.
2011/0046558 A1 2/2011 Gravesen et al.
2011/0062703 A1 3/2011 Lopez et al.
2011/0064612 A1 3/2011 Franzoni et al.
2011/0071464 A1 3/2011 Palerm
2011/0071844 A1 3/2011 Cannon et al.
2011/0072379 A1 3/2011 Gannon
2011/0077480 A1 3/2011 Bloom et al.
2011/0078608 A1 3/2011 Gannon et al.
2011/0099313 A1 4/2011 Bolanowski
2011/0105983 A1 5/2011 Kelly et al.
2011/0106561 A1 5/2011 Eaton, Jr. et al.
2011/0107251 A1 5/2011 Guaitoli et al.
2011/0137241 A1 6/2011 DelCastillo et al.
2011/0144595 A1 6/2011 Cheng
2011/0152770 A1 6/2011 Diperna et al.
2011/0160649 A1 6/2011 Pan
2011/0162647 A1 7/2011 Huby et al.
2011/0172918 A1 7/2011 Tome
2011/0175728 A1 7/2011 Baker, Jr.
2011/0190598 A1 8/2011 Shusterman
2011/0190694 A1 8/2011 Lanier et al.
2011/0218514 A1 9/2011 Rebours
2011/0264006 A1* 10/2011 Ali .................... A61M 5/14212
600/587
2011/0264043 A1 10/2011 Kotnick et al.
2011/0282321 A1 11/2011 Steil et al.
2011/0313390 A1 12/2011 Roy et al.
2011/0319728 A1 12/2011 Petisce et al.
2011/0320049 A1 12/2011 Chossat et al.
2012/0025995 A1 2/2012 Moberg et al.
2012/0059234 A1 3/2012 Barrett et al.
2012/0068001 A1 3/2012 Pushkarsky et al.
2012/0083760 A1 4/2012 Ledford et al.
2012/0089411 A1 4/2012 Srnka et al.
2012/0095433 A1 4/2012 Hungerford et al.
2012/0123322 A1 5/2012 Scarpaci et al.
2012/0143116 A1 6/2012 Ware et al.
2012/0180790 A1 7/2012 Montgomery
2012/0185267 A1 7/2012 Kamen et al.
2012/0191059 A1 7/2012 Cummings et al.
2012/0194341 A1 8/2012 Peichel et al.
2012/0203177 A1 8/2012 Lanier
2012/0222774 A1 9/2012 Husnu et al.
2012/0226350 A1 9/2012 Rudser et al.
2012/0245525 A1 9/2012 Pope et al.
2012/0259278 A1 10/2012 Hayes et al.
2012/0310204 A1 12/2012 Krogh et al.
2012/0323212 A1 12/2012 Murphy
2013/0006666 A1 1/2013 Schneider
2013/0009551 A1 1/2013 Knapp
2013/0012880 A1 1/2013 Blomquist
2013/0012917 A1 1/2013 Miller et al.
2013/0032634 A1 2/2013 McKirdy
2013/0041342 A1 2/2013 Bernini et al.
2013/0044111 A1 2/2013 VanGilder et al.
2013/0110538 A1 5/2013 Butterfield et al.
2013/0150766 A1 6/2013 Olde et al.

(56) References Cited

U.S. PATENT DOCUMENTS

| | | | |
|---|---|---|---|
| 2013/0150821 | A1 | 6/2013 | Bollish et al. |
| 2013/0184676 | A1 | 7/2013 | Kamen et al. |
| 2013/0197930 | A1 | 8/2013 | Garibaldi et al. |
| 2013/0201482 | A1 | 8/2013 | Munro |
| 2013/0218080 | A1 | 8/2013 | Peterfreund et al. |
| 2013/0116649 | A1 | 9/2013 | Kouyoumjian et al. |
| 2013/0253430 | A1 | 9/2013 | Kouyoumjian et al. |
| 2013/0253946 | A1 | 9/2013 | Broselow |
| 2013/0274576 | A1 | 10/2013 | Amirouche et al. |
| 2013/0281965 | A1 | 10/2013 | Kamen et al. |
| 2013/0291116 | A1 | 10/2013 | Homer |
| 2013/0296823 | A1 | 11/2013 | Melker et al. |
| 2013/0296984 | A1 | 11/2013 | Burnett et al. |
| 2013/0318158 | A1 | 11/2013 | Teng et al. |
| 2013/0322201 | A1 | 12/2013 | Hitchcock et al. |
| 2013/0345658 | A1 | 12/2013 | Browne et al. |
| 2013/0345666 | A1 | 12/2013 | Panduro et al. |
| 2014/0067425 | A1 | 3/2014 | Dudar et al. |
| 2014/0145915 | A1 | 5/2014 | Ribble et al. |
| 2014/0180711 | A1 | 6/2014 | Kamen et al. |
| 2014/0224829 | A1 | 8/2014 | Capone et al. |
| 2014/0267563 | A1 | 9/2014 | Baca et al. |
| 2014/0303754 | A1 | 10/2014 | Nixon et al. |
| 2015/0025453 | A1 | 1/2015 | Ledford et al. |
| 2015/0033073 | A1 | 1/2015 | Yang et al. |
| 2015/0065988 | A1 | 3/2015 | Holderle et al. |
| 2015/0168958 | A1 | 6/2015 | Downie et al. |
| 2015/0265765 | A1 | 9/2015 | Yavorsky et al. |
| 2015/0338340 | A1 | 11/2015 | Jiang et al. |
| 2015/0371004 | A1 | 12/2015 | Jones |
| 2016/0042264 | A1 | 2/2016 | Borges et al. |
| 2016/0110088 | A1 | 4/2016 | Vik et al. |
| 2016/0144101 | A1 | 5/2016 | Pananen |
| 2016/0151560 | A1 | 6/2016 | Toro et al. |
| 2016/0151562 | A1 | 6/2016 | Magers et al. |
| 2016/0151601 | A1 | 6/2016 | Cardelius et al. |
| 2016/0158437 | A1 | 6/2016 | Biasi et al. |
| 2016/0193604 | A1 | 7/2016 | McFarland et al. |
| 2016/0253460 | A1 | 9/2016 | Kanada |
| 2016/0339167 | A1 | 11/2016 | Ledford et al. |
| 2017/0043089 | A1 | 2/2017 | Handler |
| 2017/0132867 | A1 | 5/2017 | Berg et al. |
| 2017/0354941 | A1 | 12/2017 | Brown et al. |
| 2018/0018440 | A1 | 1/2018 | Sugawara |
| 2018/0300994 | A1 | 10/2018 | Nelson et al. |
| 2019/0282757 | A1 | 9/2019 | Gylland et al. |
| 2020/0113784 | A1 | 4/2020 | Lopez et al. |
| 2020/0238007 | A1 | 7/2020 | Day |
| 2021/0170101 | A1 | 6/2021 | Cavendish, Jr. et al. |
| 2021/0260283 | A1 | 8/2021 | Oruklu et al. |
| 2021/0295263 | A1 | 9/2021 | Hume et al. |
| 2021/0397396 | A1 | 12/2021 | Fryman |
| 2022/0031943 | A1 | 2/2022 | Dumas, III |
| 2022/0176037 | A1 | 6/2022 | Jacobson et al. |
| 2022/0296806 | A1 | 9/2022 | Shubinsky et al. |
| 2022/0305200 | A1 | 9/2022 | Gylland et al. |
| 2022/0331518 | A1 | 10/2022 | Shubinsky et al. |
| 2022/0362463 | A1 | 11/2022 | Lindo et al. |
| 2023/0010290 | A1 | 1/2023 | Oruklu et al. |
| 2023/0058662 | A1 | 2/2023 | Ruchti et al. |
| 2023/0058894 | A1 | 2/2023 | Ruchti et al. |

FOREIGN PATENT DOCUMENTS

| | | |
|---|---|---|
| CA | 2 113 473 | 3/1993 |
| CA | 2 551 817 | 7/2005 |
| CN | 107106042 | 8/2017 |
| DE | 31 12 762 | 1/1983 |
| DE | 34 35 647 | 7/1985 |
| DE | 35 30 747 | 3/1987 |
| DE | 37 20 664 | 1/1989 |
| DE | 38 27 444 | 2/1990 |
| DE | 197 34 002 | 9/1998 |
| DE | 199 01 078 | 2/2000 |
| DE | 198 40 965 | 3/2000 |
| DE | 198 44 252 | 3/2000 |
| DE | 199 32 147 | 1/2001 |
| DE | 102 49 238 | 5/2004 |
| DE | 103 52 456 | 7/2005 |
| EP | 0 282 323 | 9/1988 |
| EP | 0 291 727 | 11/1988 |
| EP | 0 319 272 | 6/1989 |
| EP | 0 319 275 | 6/1989 |
| EP | 0 335 385 | 10/1989 |
| EP | 0 337 092 | 10/1989 |
| EP | 0 341 582 | 11/1989 |
| EP | 0 370 162 | 5/1990 |
| EP | 0 387 724 | 9/1990 |
| EP | 0 429 866 | 6/1991 |
| EP | 0 441 323 | 8/1991 |
| EP | 0 453 211 | 10/1991 |
| EP | 0 462 405 | 12/1991 |
| EP | 0 501 234 | 9/1992 |
| EP | 0 516 130 | 12/1992 |
| EP | 0 519 765 | 12/1992 |
| EP | 0 643 301 | 3/1995 |
| EP | 0 683 465 | 11/1995 |
| EP | 0 431 310 | 1/1996 |
| EP | 0 589 439 | 8/1998 |
| EP | 0 880 936 | 12/1998 |
| EP | 0 954 090 | 11/1999 |
| EP | 0 960 627 | 12/1999 |
| EP | 1 174 817 | 1/2002 |
| EP | 1 177 802 | 2/2002 |
| EP | 1 197 178 | 4/2002 |
| EP | 1 500 025 | 4/2003 |
| EP | 1 813 188 | 8/2007 |
| EP | 1 490 131 | 12/2007 |
| EP | 2 062 527 | 5/2009 |
| EP | 2 228 004 | 9/2010 |
| EP | 2 243 506 | 10/2010 |
| EP | 2 381 260 | 10/2011 |
| ES | 254513 | 10/1981 |
| FR | 2 717 919 | 9/1995 |
| GB | 2 121 971 | 1/1984 |
| GB | 2 303 706 | 2/1997 |
| GB | 2 312 022 | 10/1997 |
| GB | 2 312 046 | 10/1997 |
| JP | 01-301118 | 12/1989 |
| JP | 01-308568 | 12/1989 |
| JP | 04-231966 | 8/1992 |
| JP | 07-502678 | 3/1995 |
| JP | 07-289638 | 11/1995 |
| JP | 11-128344 | 5/1999 |
| JP | 2000-111374 | 4/2000 |
| JP | 2000-510575 | 8/2000 |
| JP | 2000-515716 | 11/2000 |
| JP | 2001-356034 | 12/2001 |
| JP | 2002-506514 | 2/2002 |
| JP | 2002-131105 | 5/2002 |
| JP | 2003-038642 | 2/2003 |
| JP | 2003-050144 | 2/2003 |
| JP | 2005-021463 | 1/2005 |
| JP | 2005-524081 | 3/2005 |
| JP | 2006-517423 | 7/2006 |
| JP | 2007-071695 | 3/2007 |
| JP | 2007-518471 | 7/2007 |
| JP | 2007-520270 | 7/2007 |
| JP | 2007-275106 | 10/2007 |
| JP | 2008-249400 | 10/2008 |
| JP | 4322661 | 6/2009 |
| JP | 2009-148592 | 7/2009 |
| JP | 2010-063767 | 3/2010 |
| JP | 5716879 | 3/2015 |
| WO | WO 84/000690 | 3/1984 |
| WO | WO 84/000894 | 3/1984 |
| WO | WO 90/007942 | 7/1990 |
| WO | WO 91/000113 | 1/1991 |
| WO | WO 91/016087 | 10/1991 |
| WO | WO 91/016416 | 10/1991 |
| WO | WO 93/004284 | 3/1993 |
| WO | WO 95/016200 | 6/1995 |
| WO | WO 95/031233 | 11/1995 |
| WO | WO 96/008755 | 3/1996 |

(56) References Cited

FOREIGN PATENT DOCUMENTS

| | | |
|---|---|---|
| WO | WO 96/025186 | 8/1996 |
| WO | WO 96/028209 | 9/1996 |
| WO | WO 96/041156 | 12/1996 |
| WO | WO 97/010013 | 3/1997 |
| WO | WO 97/030333 | 8/1997 |
| WO | WO 98/004304 | 2/1998 |
| WO | WO 98/012670 | 3/1998 |
| WO | WO 98/014234 | 4/1998 |
| WO | WO 98/019263 | 5/1998 |
| WO | WO 98/044320 | 10/1998 |
| WO | WO 98/056441 | 12/1998 |
| WO | WO 99/015216 | 4/1999 |
| WO | WO 99/051003 | 10/1999 |
| WO | WO 99/052575 | 10/1999 |
| WO | WO 00/013580 | 3/2000 |
| WO | WO 00/013726 | 3/2000 |
| WO | WO 00/041621 | 7/2000 |
| WO | WO 01/014974 | 3/2001 |
| WO | WO 01/033484 | 5/2001 |
| WO | WO 02/005702 | 1/2002 |
| WO | WO 02/009795 | 2/2002 |
| WO | WO 02/027276 | 4/2002 |
| WO | WO 02/066101 | 8/2002 |
| WO | WO 02/087664 | 11/2002 |
| WO | WO 03/006091 | 1/2003 |
| WO | WO 03/053498 | 7/2003 |
| WO | WO 03/093780 | 11/2003 |
| WO | WO 2004/035115 | 4/2004 |
| WO | WO 2004/060455 | 7/2004 |
| WO | WO 2004/070556 | 8/2004 |
| WO | WO 2004/070994 | 8/2004 |
| WO | WO 2004/112579 | 12/2004 |
| WO | WO 2005/018716 | 3/2005 |
| WO | WO 2005/030489 | 4/2005 |
| WO | WO 2005/036447 | 4/2005 |
| WO | WO 2005/057175 | 6/2005 |
| WO | WO 2005/065146 | 7/2005 |
| WO | WO 2005/065749 | 7/2005 |
| WO | WO 2005/082450 | 9/2005 |
| WO | WO 2005/118015 | 12/2005 |
| WO | WO 2006/016122 | 2/2006 |
| WO | WO 2006/022906 | 3/2006 |
| WO | WO 2007/000426 | 1/2007 |
| WO | WO 2007/033025 | 3/2007 |
| WO | WO 2007/035567 | 3/2007 |
| WO | WO 2007/087443 | 8/2007 |
| WO | WO 2008/004560 | 1/2008 |
| WO | WO 2008/019016 | 2/2008 |
| WO | WO 2008/053193 | 5/2008 |
| WO | WO 2008/059492 | 5/2008 |
| WO | WO 2008/063429 | 5/2008 |
| WO | WO 2008/067245 | 6/2008 |
| WO | WO 2008/088490 | 7/2008 |
| WO | WO 2008/134146 | 11/2008 |
| WO | WO 2009/016504 | 2/2009 |
| WO | WO 2009/023406 | 2/2009 |
| WO | WO 2009/023407 | 2/2009 |
| WO | WO 2009/023634 | 2/2009 |
| WO | WO 2009/039203 | 3/2009 |
| WO | WO 2009/039214 | 3/2009 |
| WO | WO 2009/049252 | 4/2009 |
| WO | WO 2009/127683 | 10/2009 |
| WO | WO 2009/141504 | 11/2009 |
| WO | WO 2010/017279 | 2/2010 |
| WO | WO 2010/075371 | 7/2010 |
| WO | WO 2010/099313 | 9/2010 |
| WO | WO 2010/114929 | 10/2010 |
| WO | WO 2010/119409 | 10/2010 |
| WO | WO 2010/124127 | 10/2010 |
| WO | WO 2010/135646 | 11/2010 |
| WO | WO 2010/135654 | 11/2010 |
| WO | WO 2010/135670 | 11/2010 |
| WO | WO 2010/135686 | 11/2010 |
| WO | WO 2010/148205 | 12/2010 |
| WO | WO 2011/017778 | 2/2011 |
| WO | WO 2011/080188 | 7/2011 |
| WO | WO 2011/109774 | 9/2011 |
| WO | WO 2012/042763 | 4/2012 |
| WO | WO 2012/082599 | 6/2012 |
| WO | WO 2012/108910 | 8/2012 |
| WO | WO 2012/167090 | 12/2012 |
| WO | WO 2013/036854 | 3/2013 |
| WO | WO 2013/096769 | 6/2013 |
| WO | WO 2015/134478 | 9/2015 |
| WO | WO 2017/051271 | 3/2017 |
| WO | WO 2017/144366 | 8/2017 |
| WO | WO 2019/092680 | 5/2019 |
| WO | WO 2020/214717 | 10/2020 |
| WO | WO 2022/020184 | 1/2022 |
| WO | WO 2022/125471 | 6/2022 |

OTHER PUBLICATIONS

Alaedeen et al., "Total Parenteral Nutrition-Associated Hyperglycemia Correlates with Prolonged Mechanical Ventilation and Hospital Stay in Septic Infants", Journal of Pediatric Surgery, Jan. 2006, vol. 41, No. 1, pp. 239-244.

Alaris® Medical Systems, "Signature Edition® Gold—Single & Dual Channel Infusion System", San Diego, CA, USA, date unknown, but believed to be at least as early as Nov. 29, 2008, pp. 2-88 & 2-91.

Allegro, "3955—Full-Bridge PWM Microstepping Motor Drive", Datasheet, 1997, pp. 16.

Aragon, Daleen RN, Ph.D., CCRN, "Evaluation of Nursing Work Effort and Perceptions About Blood Glucose Testing in Tight Glycemic Control", American Journal of Critical Care, Jul. 2006, vol. 15, No. 4, pp. 370-377.

Baxter, "Baxter Receives 510(k) Clearance for Next-Generation SIGMA Spectrum Infusion Pump with Master Drug Library" Press Release, May 8, 2014, pp. 2. <http://web.archive.org/web/20160403140025/http://www.baxter.com/news-media/newsroom/press-releases/2014/05_08_14_sigma.page>.

Bequette, Ph.D., "A Critical Assessment of Algorithms and Challenges in the Development of a Closed-Loop Artificial Pancreas", Diabetes Technology & Therapeutics, Feb. 28, 2005, vol. 7, No. 1, pp. 28-47.

Bequette, B. Wayne, Ph.D., "Analysis of Algorithms for Intensive Care Unit Blood Glucose Control", Journal of Diabetes Science and Technology, Nov. 2007, vol. 1, No. 6, pp. 813-824.

Binder et al., "Insulin Infusion with Parenteral Nutrition in Extremely Low Birth Weight Infants with Hyperglycemia", Journal of Pediatrics, Feb. 1989, vol. 114, No. 2, pp. 273-280.

Bode et al., "Intravenous Insulin Infusion Therapy: Indications, Methods, and Transition to Subcutaneous Insulin Therapy", Endocrine Practice, Mar./Apr. 2004, vol. 10, Supplement 2, pp. 71-80.

Buhrdorf et al., "Capacitive Micromachined Ultrasonic Transducers and their Application", Proceedings of the IEEE Ultrasonics Symposium, Feb. 2001, vol. 2, pp. 933-940.

Cannon, MD et al., "Automated Heparin-Delivery System to Control Activated Partial Thromboplastin Time", Circulation, Feb. 16, 1999, vol. 99, pp. 751-756.

"CareAware® Infusion Management", Cerner Store, as printed May 12, 2011, pp. 3, <https://store.cerner.com/items/7>.

Chen et al., "Enabling Location-Based Services on Wireless LANs", The 11th IEEE International Conference on Networks, ICON 2003, Sep. 28-Oct. 1, 2003, pp. 567-572.

Cheung et al., "Hyperglycemia is Associated with Adverse Outcomes in Patients Receiving Total Parenteral Nutrition", Diabetes Care, Oct. 2005, vol. 28, No. 10, pp. 2367-2371.

Coley et al., "Performance of Three Portable Infusion-Pump Devices Set to Deliver 2 mL/hr", American Journal of Health-System Pharmacy, Jun. 1, 1997, vol. 54, No. 11, pp. 1277-1280.

"Continually vs Continuously", <https://web.archive.org/web/20090813092423/http://www.diffen.com/difference/Continually_vs_Continuously>, as accessed Aug. 13, 2009 in 4 pages.

"CritiCore® Monitor: Critical Fluid Output and Core Bladder Temperature Monitor", BARD Urological Catheter Systems, Advertisement, 2005, pp. 2.

(56) References Cited

OTHER PUBLICATIONS

Daimiwal et al., "Wireless Transfusion Supervision and Analysis Using Embedded System", IEEE, 2010 International Conference ICBBT, China, Apr. 2010, pp. 56-60.
Davidson et al., "A Computer-Directed Intravenous Insulin System Shown to be Safe, Simple, and Effective in 120,618 h of Operation", Diabetes Care, Oct. 2005, vol. 28, No. 10, pp. 2418-2423.
"Decision of the Administrative Council of Oct. 16, 2013 Amending Rule 135 and 164 of the Implementing Regulations to the European Patent Convention (CA/D 17/13)", Official Journal EPO Nov. 2013, Nov. 2013, pp. 503-506. <http://archive.epo.org/epo/pubs/oj013/11_13/11_5033.pdf>.
"Decision of the Administrative Council of Oct. 27, 2009 Amending the Implementing Regulations to the European Patent Convention (CA/D 20/09)", Official Journal EPO Dec. 2009, Dec. 2009, pp. 582-584. <http://archive.epo.org/epo/pubs/oj009/12_09/12_5829.pdf>.
Diabetes Close Up, Close Concerns AACE Inpatient Management Conference Report, Consensus Development Conference on Inpatient Diabetes and Metabolic Control, Washington, D.C., Dec. 14-16, 2003, pp. 1-32.
"Differential Pressure Transmitter, Series PD-39 X", SensorsOne Ltd., Advertisement, Dec. 2005, pp. 2.
Dunster et al., "Flow Continuity of Infusion Systems at Low Flow Rates", Anaesthesia and Intensive Care, Oct. 1995, vol. 23, No. 5, pp. 5.
Fogt et al., Development and Evaluation of a Glucose Analyzer for a Glucose-Controlled Insulin Infusion System (Biostator®), Clinical Chemistry, 1978, vol. 24, No. 8, pp. 1366-1372.
"Froth", <http://www.merriam-webster.com/dictionary/froth>, as accessed May 13, 2015 in 1 page.
Goldberg et al., "Clinical Results of an Updated Insulin Infusion Protocol in Critically Ill Patients", Diabetes Spectrum, 2005, vol. 18, No. 3, pp. 188-191.
Halpern et al., "Changes in Critical Care Beds and Occupancy in the United States 1985-2000: Differences Attributable to Hospital Size", Critical Care Medical, Aug. 2006, vol. 34, No. 8, pp. 2105-2112.
Hospira, "Plum A+™ Infusion System" as archived Dec. 1, 2012, pp. 2. <www.hospira.com/products_and_services/infusion_pumps/plum/index>.
Hospira, "Plum XL™ Series Infusion System" Technical Service Manual, Feb. 2005, Lake Forest, Illinois, USA, pp. i-vii, 5-14, 8-3.
Ilfeld et al., "Delivery Rate Accuracy of Portable, Bolus-Capable Infusion Pumps Used for Patient-Controlled Continuous Regional Analgesia", Regional Anesthesia and Pain Medicine, Jan.-Feb. 2003, vol. 28, No. 1, pp. 17-23.
Ilfeld et al., "Portable Infusion Pumps Used for Continuous Regional Analgesia: Delivery Rate Accuracy and Consistency", Regional Anesthesia and Pain Medicine, Sep.-Oct. 2003, vol. 28, No. 5, pp. 424-432.
International Search Report and Written Opinion received in PCT Application No. PCT/US2022/081123, dated Mar. 9, 2023 in 12 pages.
JMS Co., Ltd., "Infusion Pump: OT-701", Tokyo, Japan, 2002, pp. 4.
Kim, M.D., et al., "Hyperglycemia Control of the Nil Per Os Patient in the Intensive Care Unit: Introduction of a Simple Subcutaneous Insulin Algorithm", Nov. 2012, Journal of Diabetes Science and Technology, vol. 6, No. 6, pp. 1413-1419.
Kutcher et al., "The Effect of Lighting Conditions on Caries Interpretation with a Laptop Computer in a Clinical Setting", Elsevier, Oct. 2006, vol. 102, No. 4, pp. 537-543.
Lamsdale et al., "A Usability Evaluation of an Infusion Pump by Nurses Using a Patient Simulator", Proceedings of the Human Factors and Ergonomics Society 49th Annual Meeting, Sep. 2005, pp. 1024-1028.
Logan et al., "Fabricating Capacitive Micromachined Ultrasonic Transducers with a Novel Silicon-Nitride-Based Wafer Bonding Process", IEEE Transactions on Ultrasonics, Ferroelectrics, and Frequency Control, May 2009, vol. 56, No. 5, pp. 1074-1084.
Magaji et al., "Inpatient Management of Hyperglycemia and Diabetes", Clinical Diabetes, 2011, vol. 29, No. 1, pp. 3-9.
Mauseth et al., "Proposed Clinical Application for Tuning Fuzzy Logic Controller of Artificial Pancreas Utilizing a Personalization Factor", Journal of Diabetes Science and Technology, Jul. 2010, vol. 4, No. 4, pp. 913-922.
Maynard et al., "Subcutaneous Insulin Order Sets and Protocols: Effective Design and Implementation Strategies", Journal of Hospital Medicine, Sep./Oct. 2008, vol. 3, Issue 5, Supplement 5, pp. S29-S41.
Merry et al., "A New, Safety-Oriented, Integrated Drug Administration and Automated Anesthesia Record System", Anesthesia & Analgesia, Aug. 2001, vol. 93, No. 2 pp. 385-390.
Microchip Technology Inc., "MTA11200B; TrueGauge™ Intelligent Battery Management I.C.", <https://www.elektronik.ropla.eu/pdf/stock/mcp/mta11200b.pdf>, 1995, pp. 44.
Moghissi, Etie, MD, FACP, FACE, "Hyperglycemia in Hospitalized Patients", A Supplement to ACP Hospitalist, Jun. 15, 2008, pp. 32.
Nuckols et al., "Programmable Infusion Pumps in ICUs: An Analysis of Corresponding Adverse Drug Events", Journal of General Internal Medicine, 2007, vol. 23, Supp. 1, pp. 41-45.
Pretty et al., "Hypoglycemia Detection in Critical Care Using Continuous Glucose Monitors: An in Silico Proof of Concept Analysis", Journal of Diabetes Science and Technology, Jan. 2010, vol. 4, No. 1, pp. 15-24.
Saager et al., "Computer-Guided Versus Standard Protocol for Insulin Administration in Diabetic Patients Undergoing Cardiac Surgery", Annual Meeting of the American Society of Critical Care Anesthesiologists, Oct. 13, 2006.
Sebald et al., "Numerical Analysis of a Comprehensive in Silico Subcutaneous Insulin Absorption Compartmental Model", 31st Annual International Conference of the IEEE Engineering in Medicine and Biology Society, Sep. 2-6, 2009, pp. 3901-3904.
SGS-Thomson Microelectronics, "L6219—Stepper Motor Drive", Datasheet, Dec. 1996, pp. 10.
SGS-Thomson Microelectronics, "PBL3717A—Stepper Motor Drive", Datasheet, Apr. 1993, pp. 11.
Simonsen, Michael Ph.D., POC Testing, New Monitoring Strategies on Fast Growth Paths in European Healthcare Arenas, Biomedical Business & Technology, Jan. 2007, vol. 30, No. 1, pp. 1-36.
Smith, Joe, "Infusion Pump Informatics", CatalyzeCare: Transforming Healthcare, as printed May 12, 2011, pp. 2.
Tang et al., "Linear Dimensionality Reduction Using Relevance Weighted LDA", Pattern Recognition, 2005, vol. 38, pp. 485-493, <http://staff.ustc.edu.cn/~ketang/papers/TangSuganYaoQin_PR04.pdf>.
Thomas et al., "Implementation of a Tight Glycaemic Control Protocol Using a Web-Based Insulin Dose Calculator", Anaesthesia, 2005, vol. 60, pp. 1093-1100.
Van Den Berghe, M.D., Ph.D., et al., "Intensive Insulin Therapy in Critically Ill Patients", The New England Journal of Medicine, Nov. 8, 2001, vol. 345, No. 19, pp. 1359-1367.
Van Den Berghe, M.D., Ph.D., et al., "Intensive Insulin Therapy in the Medical ICU", The New England Journal of Medicine, Feb. 2, 2006, vol. 354, No. 5, pp. 449-461.
Westbrook et al., "Errors in the Administration of Intravenous Medications in Hospital and the Role of Correct Procedures and Nurse Experience", BMJ Quality & Safety, 2011, vol. 20, pp. 1027-1034.
Zakariah et al., "Combination of Biphasic Transmittance Waveform with Blood Procalcitonin Levels for Diagnosis of Sepsis in Acutely Ill Patients", Critical Care Medicine, 2008, vol. 36, No. 5, pp. 1507-1512.

* cited by examiner

MEDICAL FLUID COMPOUNDING SYSTEMS WITH COORDINATED FLOW CONTROL

RELATED APPLICATIONS

This application claims the benefit under 35 U.S.C. § 119(e) of U.S. Provisional Patent Application No. 63/288,491, filed on Dec. 10, 2021, and entitled, "MEDICAL FLUID COMPOUNDING SYSTEMS WITH COORDINATED FLOW CONTROL," the entire contents of are hereby incorporated by reference herein and made a part of this specification for all that it discloses.

BACKGROUND

Technical Field

Some embodiments in this specification relate generally to devices and methods for transferring fluid and specifically to devices and methods for transferring medical fluids.

Related Technology

In some circumstances it can be desirable to transfer one or more fluids between containers. In the medical field, it is often desirable to dispense fluids in precise amounts and combinations. Current fluid transfer devices and methods in the medical field suffer from various drawbacks, including potential operational failures or inefficiencies due to the viscosity of at least one of the component fluids of a mixture.

SUMMARY

In some embodiments, an electronically controlled compounding system can be provided to transfer fluids from a plurality of source containers to a target container. The compounding system can include a plurality of fluid transfer stations, each of the plurality of fluid transfer stations comprising an electric motor and a pump functionally connected to the electric motor. The pump can be actuatable via the electric motor to transfer fluid between a source container and an outlet line in fluid communication with the pump. The compounding system can include a mixing manifold in fluid communication with the outlet lines of each of the plurality of fluid transfer stations, the mixing manifold comprising an outlet connector configured to be placed in fluid communication with a target container. The compounding system can include an electronic controller configured to receive information from each of the plurality of electric motors indicative of a measured back electromotive force (EMF) voltage during operation of the electric motors and control the operation of the plurality of electric motors based at least in part on the received information indicative of the measured back EMF voltages.

BRIEF DESCRIPTION OF THE DRAWINGS

Certain embodiments of the invention will now be discussed in detail with reference to the following figures. These figures are provided for illustrative purposes only, and the embodiments are not limited to the subject matter illustrated in the figures.

DETAILED DESCRIPTION OF SOME EXAMPLE EMBODIMENTS

Figure 1:
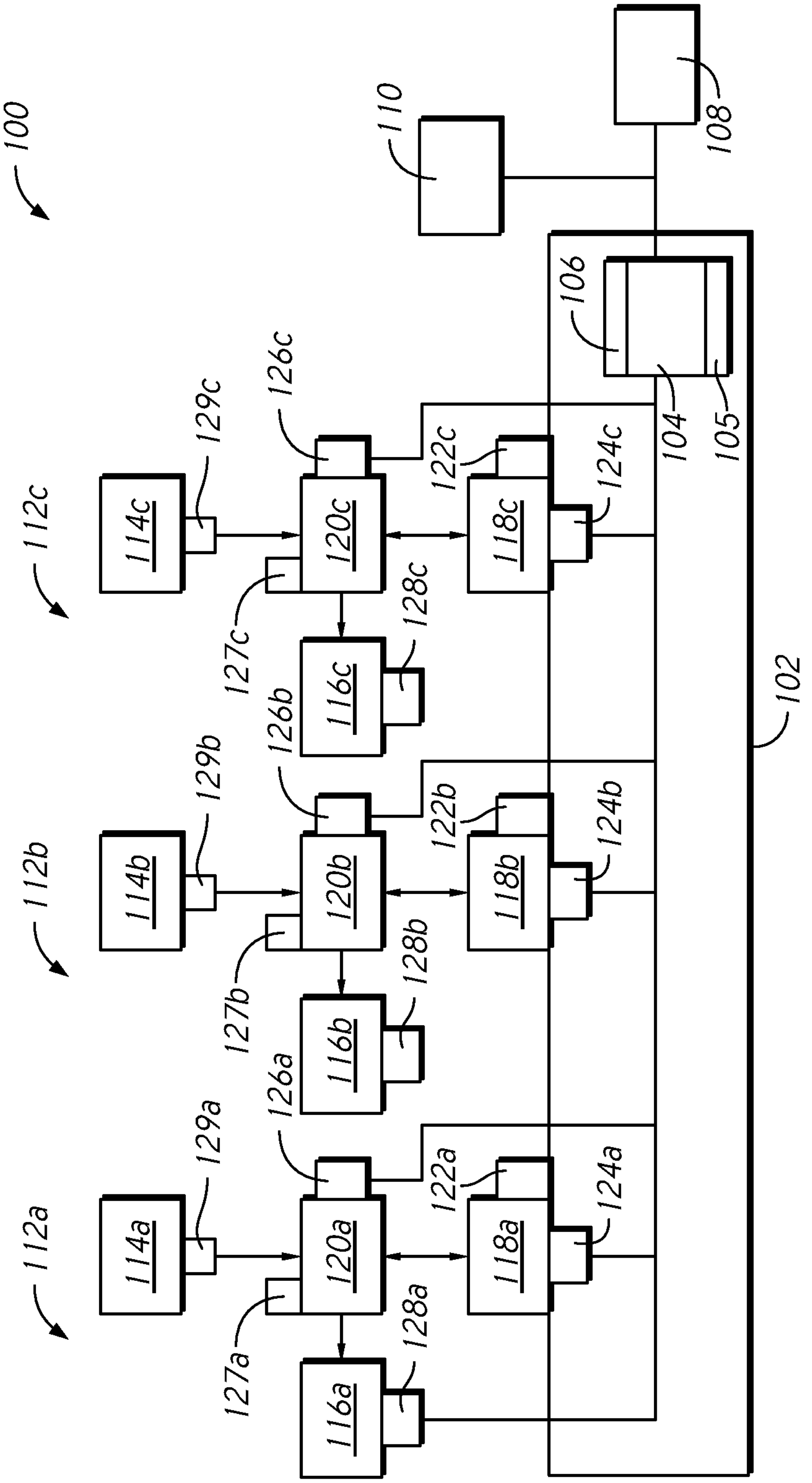
FIG. 1 schematically shows an embodiment of an automated system for transferring precise amounts of fluid.

The following detailed description is now directed to certain specific example embodiments of the disclosure. In this description, reference is made to the drawings wherein like parts are designated with like numerals throughout the description and the drawings. Nothing in this specification is essential or indispensable; any component, structure, feature, material, method, and/or step can be used separately or omitted. All components, structures, features, materials, methods, and steps that are illustrated and/or described in this specification in separate embodiments can be combined or used separately.

In many circumstances, precise mixtures of fluids are dispensed into a single container in a desired volume, or to provide a desired mixture. For example, a total parenteral nutrition (TPN) solution can be used in an enteral feeding process, and can be provided to a patient via a feeding tube. In order to address the nutritional needs of a particular patient, a precise TPN mixture can be prescribed by a medical practitioner to provide a specific mix of component, such as amino acids, dextrose, and lipids, in a desired ratio and quantity. In some embodiments, a wide range of TPN solutions can be provided by combining a number of source solutions in specific ratios and volumes.

The dispensation and mixture of solutions such as a TPN solution can be at least partially automated through the use of a compounder or other dispensing mechanism which can dispense solutions or other fluids from one or more source containers into one or more target containers. Embodiments of compounders and other dispensing mechanisms can allow for precise, automated dispensation or compounding of a solution such as a TPN solution.

In some circumstances fluid is transferred from a source container to a target container. In some instances, it can be desirable to transfer precise amounts of a fluid such as a medication or solution into the target container. For example, in some embodiments a solution can be stored in a comparatively large container, and a precise dosage amount of the solution can be extracted and transferred to a target device so that a desired dose of the solution can be delivered to a patient. In some embodiments, fluid from multiple source containers can be combined, or compounded, into a single target container. For example, in some embodiments a mixture of solutions can be created in the target container, or a concentrated solution can be combined with a diluent in the target container. To achieve the desired proportions of fluids, it can be desirable to precisely measure the amounts of fluids transferred into the target container. Also, precisely controlling the operation of the fluid transfer process can reduce the amount of fluid wasted (e.g., through improper mixture of the solution in the source container, or backflow into one or more source containers or other components of a compounder or mixing device). Reduction of waste is desirable because in some instances the fluid being transferred can be expensive. Some embodiments disclosed herein provide a fluid transfer device for transferring precise amounts of fluid from one or more source containers into one or more target containers.

FIG. 1 schematically shows an embodiment of an automated fluid transfer system 100. The system 100 can include a housing 102 enclosing a controller 104 and a memory module 106. The system 100 can also include a user interface 108, which can be, for example, external to the housing 102. The user interface 108 can also be integrated into the housing 102 in some cases. The user interface 108 can include, for example, a display, a keypad, and/or a touch screen display. The user interface 108 can be configured to receive instructions from the user, for example, regarding the amounts of fluid to be transferred and the types of fluids to be transferred. The user interface can also be configured to provide information to the user, such as error messages, alerts, or instructions (e.g., to replace an empty source container). The system 100 can also include a system for obtaining information from a machine-receivable source, such as a bar code scanner 110 or a near-field communication device (e.g., an RFID) in communication with the controller 104. Although in the embodiment shown, the controller 104 and memory module 106 are contained within the housing 102, a variety of other configurations are possible. For example, controller 104 can be external to the housing 102, and can be, for example contained within a second housing which also contains the user interface 108. In some embodiments, the system 100 can include a communication interface 105 configured to receive information (e.g., instructions) from a remote source such as a terminal or an automated management system, etc. In some embodiments, the communication interface can also send information (e.g., results or alerts) to the remote source. In some embodiments, the system 100 does not include a communication interface 105 and does not communicate with a remote source.

The system 100 can include multiple transfer stations 112*a-c*. In the embodiment shown, the system 100 includes three transfer stations 112*a-c,* but a different number of transfer stations can be used. For example, in some embodiments, the system can include a single transfer station. In other embodiments, the system can include two, four, five, six, seven, eight, or more transfer stations depending on the number of different fluid types the system is designed to handle and the amount of fluid to be transferred.

Each transfer station 112*a-c* can include a fluid source container 114*a-c,* which can be, for example, a medical vial or other suitable container such as a bag, a bottle, or a vat, etc. Although many embodiments disclosed herein discuss using a particular type of source container as the source container, it will be understood the other containers can be used even when not specifically mentioned. In some embodiments, each of the source containers 114*a-c* can contain a unique fluid, providing a variety of fluids that the user can select for transfer. In other embodiments, two or more of the source containers 114*a-c* can contain the same fluid. In some embodiments, the source containers 114*a-c* include machine-receivable sources, such as bar codes, that identify the types of fluid contained therein. The bar codes can be scanned by the scanner 110 so that the identities of the fluids contained by source containers 114*a-c* can be stored within memory module 106. In some embodiments, the fluid transfer stations 112*a-c* are configured to transfer precise amounts of fluid from source containers 114*a-c* to target containers 116*a-c,* which can be, for example IV bags. It will be understood that in various embodiments described herein, a different type of target connector or destination container can be used instead of an IV bag (e.g., a syringe, a bottle, a vial, etc.) even when not specifically mentioned.

In some embodiments the fluid can first be transferred from source containers 114*a-c* to intermediate measuring containers 118*a-c* so that a precise amount of fluid can be measured. The intermediate measuring containers 118*a-c* can be, for example, syringes. After being measured, the fluid can be transferred from intermediate measuring containers 118*a-c* to the target containers 116*a-c*. In some embodiments, one or more of the transfer stations 112*a-c* can include one or more pairs of male and female fluid connectors configured to be attached to each other to selectively permit the passage of fluid. When fluid transfer is completed, the connectors can be detached or disconnected. In some embodiments, the connectors can be configured to automatically close. The fluid module can be removed while retaining substantially entirely or entirely all of the remaining interior fluid within the respective connectors and the rest of the fluid module, thus permitting the transfer to occur in a substantially entirely or entirely closed system, thereby diminishing the risk of damage caused by liquid or vapor leakage from the fluid module after disconnection and from the fluid source and the fluid destination after disconnection.

In some embodiments, the system 100 can be configured to be compatible with a variety of sizes of syringes. For example, larger volume syringes can be used to transfer larger volumes of fluid in shorter amounts of time. Smaller volume syringes can be used to increase the accuracy and precision with which amounts of fluid can be transferred. In some embodiments, the syringes can include a machine-receivable source, such as a bar code, which identifies the volume of the syringe. The bar code can be scanned by a bar code scanner 110, so that the sizes of the syringes used by the different transfer stations 112*a-c* can be stored within memory module 106 for use by the controller 104.

In some embodiments, connectors 120*a-c* connect the source containers 114*a-c,* the intermediate containers 118*a-c,* and the target containers 116*a-c*. In some embodiments, the connectors 120*a-c* can include first check valves (not shown) configured to allow fluid to flow from the source containers 114*a-c* into the connector 120*a-c,* and block fluid from flowing connector 120*a-c* into the source containers 114*a-c,* as shown by single-headed arrows. The connectors 120*a-c* can also include second check valves (not shown) configured to allow fluid to flow from connectors 120*a-c* into target containers 116*a-c,* but block fluid from flowing from target containers 116*a-c* into connectors 120*a-c,* as shown by single-headed arrows. In some embodiments, the connectors 120*a-c* can be in two-way fluid communication with the intermediate containers 118*a-c,* as shown by double-headed arrows.

In some embodiments, the system 100 can include mounting modules 122*a-c* for mounting the transfer stations 112*a-c* onto the housing 102. For example, in some embodiments the mounting modules 122*a-c* can be configured to securely receive intermediate measuring containers 118*a-c* as shown in FIG. 1. The system 100 can also include motors 124*a-c,* which can be for example, contained within housing 102. The motors 104*a-c* can be configured to actuate the plungers on the syringes 118*a-c* to draw fluid into the syringes and to dispel fluid therefrom. The motors 124*a-c* can be in communication with the controller 104, and can receive actuation instructions from the controller 104. The motors 124*a-c* can also provide signals to the controller 104 indicative of the current operational state of the motors 124*a-c,* as discussed in greater detail below.

In some embodiments, the system can include fluid detectors 126*a-c* configured to detect a presence or absence of fluid in connectors 120*a-c*. The fluid detectors 126*a-c* can be in communication with the controller 104 so that when the detectors 126*a-c* detect an absence of fluid in connectors 120*a-c,* indicating that source fluid containers 114*a-c* have run dry, they can send a signal to controller 104 that a source container 114*a-c* needs to be replaced. The fluid detectors 126*a-c* can be for example an infrared LED and photo detector, or other type of electronic eye, as will be discussed in more detail below. In the embodiment shown, fluid detectors 126*a-c* are shown connected to connectors 128*a-c,* but other configurations are possible. For example, fluid detectors 126*a-c* can be connected to fluid source containers 114*a-c* themselves.

In some embodiments, the system 100 can include compatibility mechanisms 127*a-c* for ensuring that an approved connector 120*a-c* has been placed in communication with the system 100 to ensure the accuracy of the amount of fluid transferred. The compatibility mechanisms 127*a-c* can be, for example, a specifically shaped mounting feature configured to correspond to a portion of the connector 120*a-c*.

In some embodiments, the system 100 can include source adapters 129*a-c* configured to receive the source containers 114*a-c* and removably connect to the connectors 120*a-c*. Thus, when a source container 114*a-c* runs out of fluid, the empty source container 114*a-c* and its corresponding adapter 129*a-c* can be removed and replaced without removing the associated connector 120*a-c* from the system 100. In some embodiments, source adapters 129*a-c* can be omitted, and the source containers 114*a-c* can be directly received by the connectors 120*a-c*.

In some embodiments the system 100 can include sensors 128*a-c* for detecting the presence of target containers 116*a-c*. Sensors 128*a-c* can be in communication with the controller 104 so as to prevent the system 100 from attempting to transfer fluid when no target container 116*a-c* is connected. A variety of sensor types can be used for sensors 128*a*-128*c*. For example, sensors 128*a-c* can be weight sensors or infrared sensors or other form of electronic eye. In some embodiments, weight sensors 128*a-c* can also be used to measure the weight of the target containers 116*a-c* after fluid has been transferred. The final weight of a target container 116*a-c* can be compared to an expected weight by the controller 104 to confirm that the proper amount of fluid was transferred into the target container 116*a-c*. Sensors 128*a-c* can be a variety of other sensor types, for example sensor pads or other sensor types able to detect the presence of target containers 116*a-c*.

Figure 2:
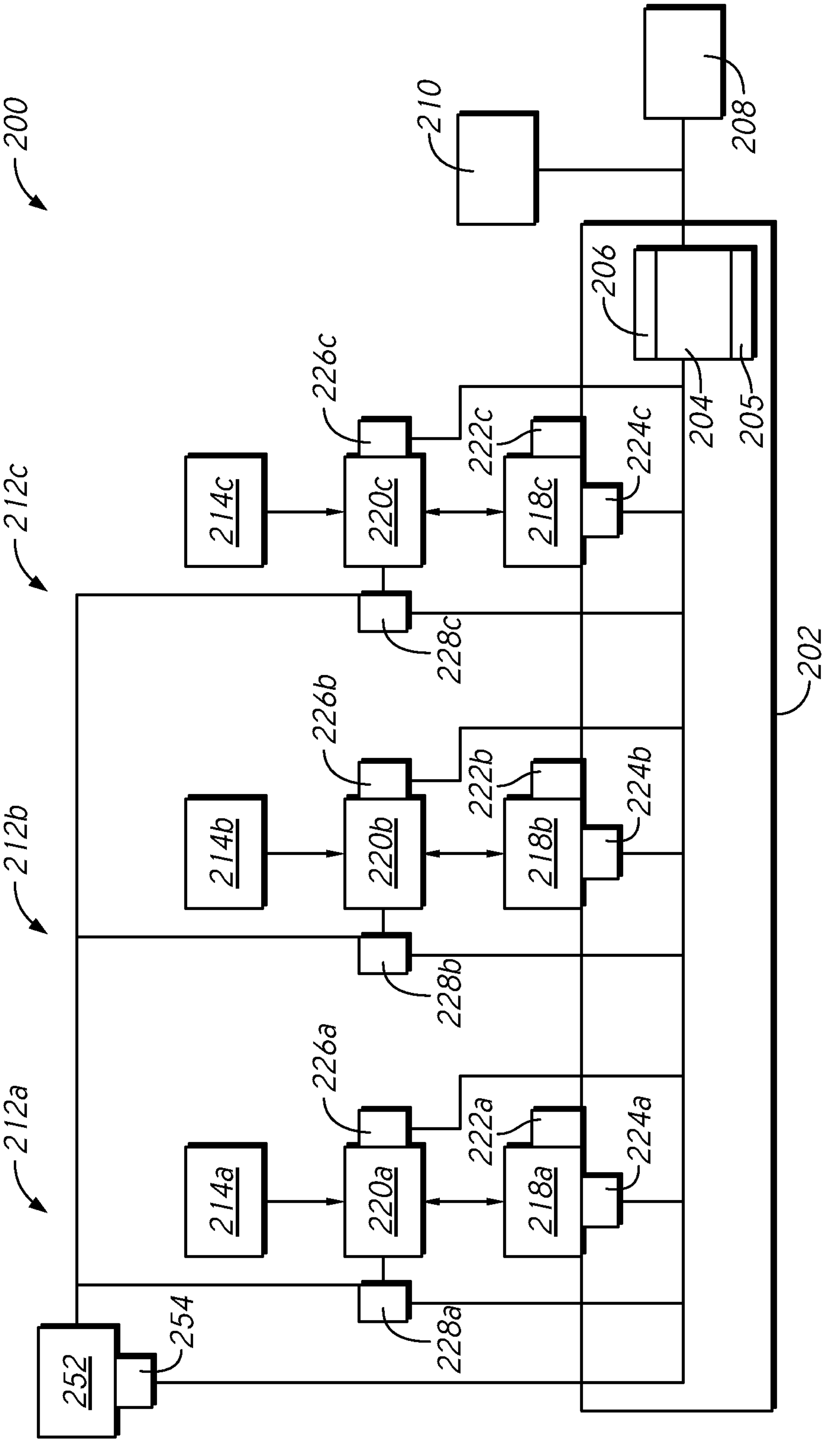
FIG. 2 schematically shows an embodiment of an automated system for compounding mixtures of precise amounts of fluid.

FIG. 2 schematically illustrates a system 200 for automated precise transfer of fluids. System 200 can be the same as or similar to the system 100 in some regards. Some features shown in FIG. 1, such as the adapters 129*a-c* and compatibility mechanisms 127*a-c,* are not shown specifically in the system 200, but it will be understood that system 200 can include corresponding features. The system 200 can include a housing 202, a controller 204, a memory 206, a user interface 208, a scanner 210, and a communication interface 205, similar to those describe above in connection with the system 100. System 100 is configured to transfer individual fluids from the source containers 114*a-c* to target containers 116*a-c*. System 200, on the other hand, is configured to transfer and combine fluids from source containers 214a-c into a common target container. Thus, system 200 can be used for compounding mixtures of fluids. In some embodiments, a single system can be configured both for compounding mixtures of fluids and for the transfer of individual fluids from a single-source container to a single-target container. For example, a system containing six fluid transfer stations can be configured so that transfer stations 1-3 are dedicated to compounding mixtures of fluids into a single common target container, while fluid transfer stations 4-6 can be configured to each transfer fluid from a single source container to a single target container. Other configurations are possible. In the embodiment shown in FIG. 2, the system 200 can include sensors 228*a-c* for detecting whether or not the connectors 220*a-c* are connected to the common target container 216. The system 200 can also include a sensor for detecting the presence of the common target container 216. In some embodiments, the sensor can measure the weight of the common target container 216 and can report the weight to the controller 104. The controller 104 is then able to compare the final weight of the common target container with an expected weight to confirm that the common target container was filled with the correct amount of fluids.

In some embodiments, a system 200 can be a TPN compounder, such as a total parenteral nutrition (TPN) compounder for providing a customized TPN solution from a plurality of source solutions.

Figure 3:
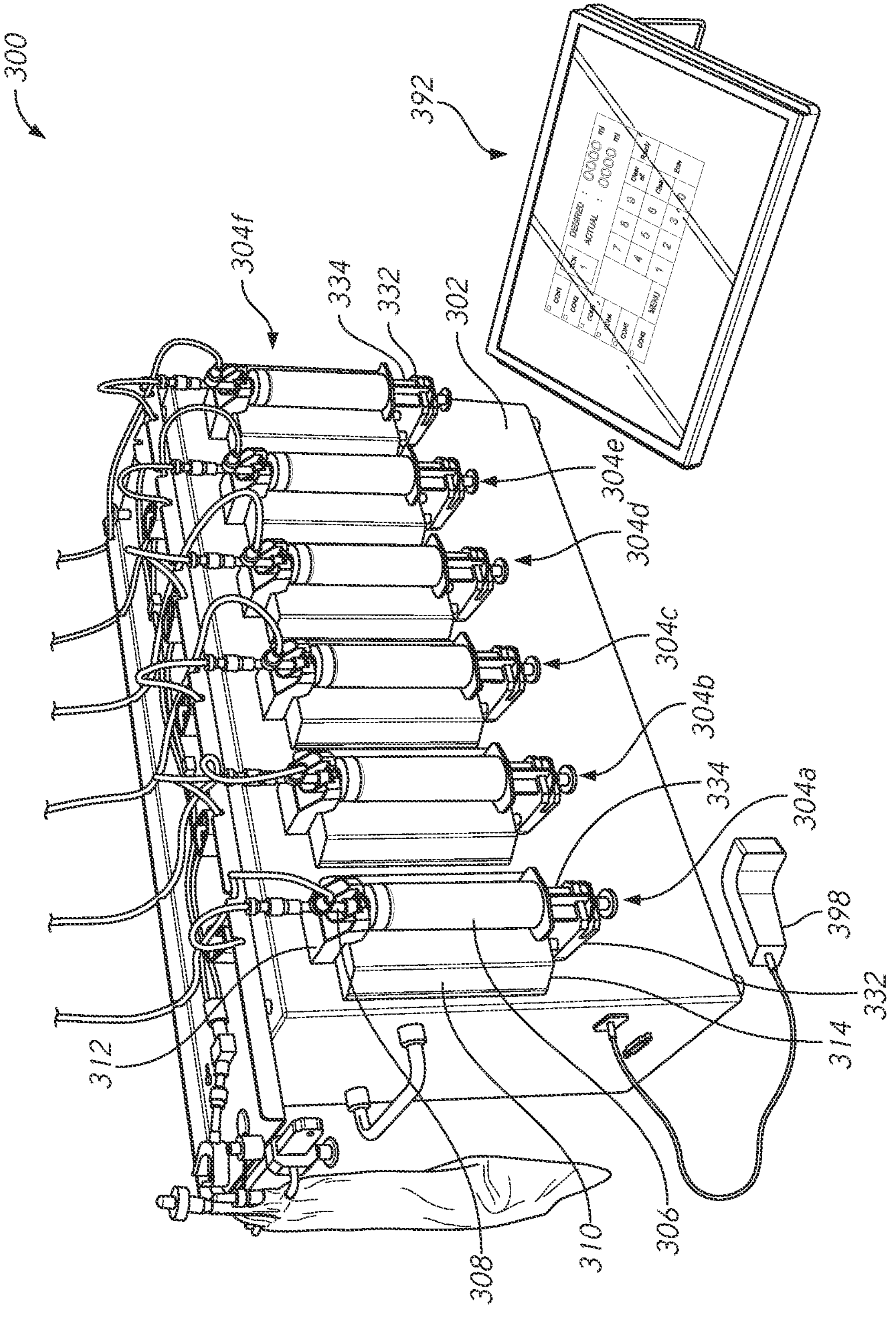
FIG. 3 is a perspective view of an example of an automated compounding system for transferring fluid having multiple transfer stations.

FIG. 3 is a perspective view of an automated system 300 for transferring fluid. Any component, structure, material, method, and/or step that is illustrated and/or described in connection with FIG. 3 can be used with or instead of any component, structure, material, method, and/or step that is illustrated and/or described in any other embodiment in this specification or known in the art. The automatic system 300 can be similar to or the same as the other automated fluid transfer systems (e.g., 100, 200) disclosed herein. The system 300 can include a base housing 302, and six transfer stations 304*a-f,* located on a front side of the base housing 302. In some embodiments, the system 300 can include a different number of transfer stations 304*a-f* (e.g., one, two, four, five, eight, or more transfer stations). In some embodiments, the transfer stations 304*a-f* can be distributed on multiple sides of the base housing 302. Transfer stations 304*b-f* are shown in an empty state having no syringe attached thereto. Transfer station 304*a* is shown having a syringe 306 and a connector 308 attached thereto. During operation, a source container (see FIG. 4) can be attached to the top of the connector 308 and an IV bag (not shown) can be placed in fluid connection with the connector 308 so that fluid can be transferred from the fluid source container to the syringe 306 and then from the syringe 306 into the IV bag, as discussed in greater detail elsewhere herein. Also, during operation, some or all of the transfer stations 304*a-f* can be equipped similarly to transfer station 304*a*. In some embodiments, multiple transfer stations 304*a-f* can operate simultaneously. In some embodiments, multiple transfer stations 304*a-f* can be placed in fluid communication with a single IV bag so that fluid from multiple fluid source containers can be combined into a single IV bag. In some embodiments, one or more of the transfer stations 304*a-f* can include a dedicated IV bag so that fluid from only a single transfer stations can be transferred into the dedicated IV bag.

The transfer station 304*a* can include an auxiliary housing 310 connected to the base housing 302. The transfer station 304*a* can also include a top connector piece 312 attached to the base housing 302 above the auxiliary housing 310, and a bottom connector piece 314 attached to the base housing 302 below the auxiliary housing 310. The top connector piece 312 and the bottom connector piece 314 can extend out a distance past the auxiliary housing 310, and a pair of guiding shafts (not shown) can extend vertically between the top connector piece 312 within the auxiliary housing 310 and the bottom connector piece 314. A middle connector piece (not shown) can be attached to the shafts. The transfer station 304*a* can include an actuator 332 configured to retract and advance the plunger 334 of the syringe 306. In the embodiment shown, the actuator 332 includes an actuator base 336.

In some embodiments, a motor (not shown) is located inside the auxiliary housing 310. The motor can be an electric motor, a pneumatic motor, a hydraulic motor, or other suitable type of motor capable of moving the actuator 332. In some embodiments, the motor can be a piston type motor. In some embodiments, the motor is contained within the base housing 302 rather than in the auxiliary housing 310. In some embodiments, each transfer station 304*a-f* has an individual motor dedicated to the individual transfer station 304*a-f*. In some embodiments, one or more of the transfer stations 304*a-f* share a motor, and in some embodiments, the system 300 includes a single motor used to drive all the transfer stations 304*a-f*. The motor can drive the shafts 338*a-b* downward out of the auxiliary housing 310, which in turn drives the rest of the actuator 332 downward causing the plunger 334 to retract from the syringe body 324 to draw fluid into the syringe. The motor can drive the rest of the actuator 332 upward, causing the plunger 334 to advance into the syringe 306 to expel fluid from the syringe.

The system 300 can include a controller, for controlling the operations of the transfer stations 304*a-f*. The controller can start and stop the motor(s) of the system 300 to control the amount of fluid that is transferred from the fluid source container to the IV bag at each transfer station 304*a-f*. The controller can be one or more microprocessors or other suitable type of controller. The controller can be a general purpose computer processor or a special purpose processor specially designed to control the functions of the system 300. The controller can include, or be in communication with, a memory module that includes a software algorithm for controlling the operations of the system 300. The controller can be contained within the base housing 302. In some embodiments, the controller can be external to the base housing 302, and can be for example the processor of a general purpose computer that is in wired or wireless communication with components of the system 300.

In some embodiments, any transfer station 304*a* can include a sensor configured to determine when the liquid in the source container has run out. If the plunger 334 is retracted to draw fluid into the syringe 306 when the fluid source container contains no more fluid, air is drawn out of the fluid source container and travels into the connector 308 toward the syringe. Air can also be drawn into the connector 308 when the fluid source container still contains a small amount of fluid, but the fluid level is low enough that air is drawn out of the fluid source container along with the fluid (e.g., as an air bubble). In some embodiments, the sensor can detect air in the connector 308. For example, the sensor can be an infrared light source (e.g., an LED) and a photodetector, or other form of electric eye.

As shown in FIG. 3, the system 300 can include a user interface 392 for receiving information and commands from the user and for providing information to the user. The user interface 392 can be part of an external unit, or it can be integrated into or attached to the base housing 302. The user interface 392 can include, for example, a touch screen display. The user interface 392 can be in wired or wireless communication with the controller. In some embodiments, a cable connects the external unit to the base housing 302 and provides a communication link between the user interface 392 and the controller. In some embodiments, the controller can be contained in the external unit along with the user interface 392 and the controller can send and receive signals to and from components (e.g., the motors) of the system 300 through the cable. The user interface 392 can be configured to receive instructions from the user regarding the amounts of fluids to be transferred by the transfer stations 304*a*-304*f*. The user interface 392 can deliver the instructions to the controller to be stored in a memory and/or used to actuate the motor(s) to transfer the desired amount of fluids.

In some embodiments, the system 300 can include a communication interface. The communication interface can be configured to provide a communication link between the controller and a remote source, such as a remote terminal or an automated management system. The communication link can be provided by a wireless signal or a cable or combination of the two. The communication link can make use of a network such as a WAN, LAN, or the internet. In some embodiments, the communication interface can be configured to receive input (e.g., fluid transfer commands) from the remote source and can provide information (e.g., results or alerts) from the controller to the remote source. In some embodiments, the remote source can be an automated management system which can coordinate actions between multiple automated fluid transfer systems (e.g., 100, 200, and 300).

The system 300 can also include a device for receiving information from a machine-receivable source, such as a bar code scanner 398 or other device, in communication with the controller and/or memory. The bar code scanner 398 can be used to provide information about the system 300 to the controller and/or the memory. For example, the syringe 306 can include a bar code that identifies the size and type of the syringe 306. The user can scan the syringe 306 with the bar code scanner 398 and then scan a bar code associated with the transfer station 304*a* to inform the controller of the size of the syringe 306 that is attached to the transfer station 304*a*. Different sizes of syringes can hold different volumes of fluid when their plungers are withdrawn by the same distance. Thus, when the controller is tasked with filling the syringe 306 with a predetermined amount of fluid, the controller can determine how far the plunger is to be withdrawn to fill the particular type of syringe with the predetermined amount of fluid. The fluid source containers (not shown) can also include bar codes that indicate the type of fluid contained therein. The user can scan a fluid source container and then scan the bar code associated with the particular transfer station the fluid source container is to be installed onto. Thus, the controller can be aware of what fluids are controlled by which transfer stations to facilitate automated transfer of fluids. Other components of the system 300 can also include bar codes readable by the bar code scanner 398 for providing information about the components to the controller and/or memory. In some embodiments, the user interface 392 can be configured to allow the user to input data relating to the size of the syringe 306, the type of fluid contained in a fluid bag, etc. instead of using the bar code scanner 398.

Figure 4:
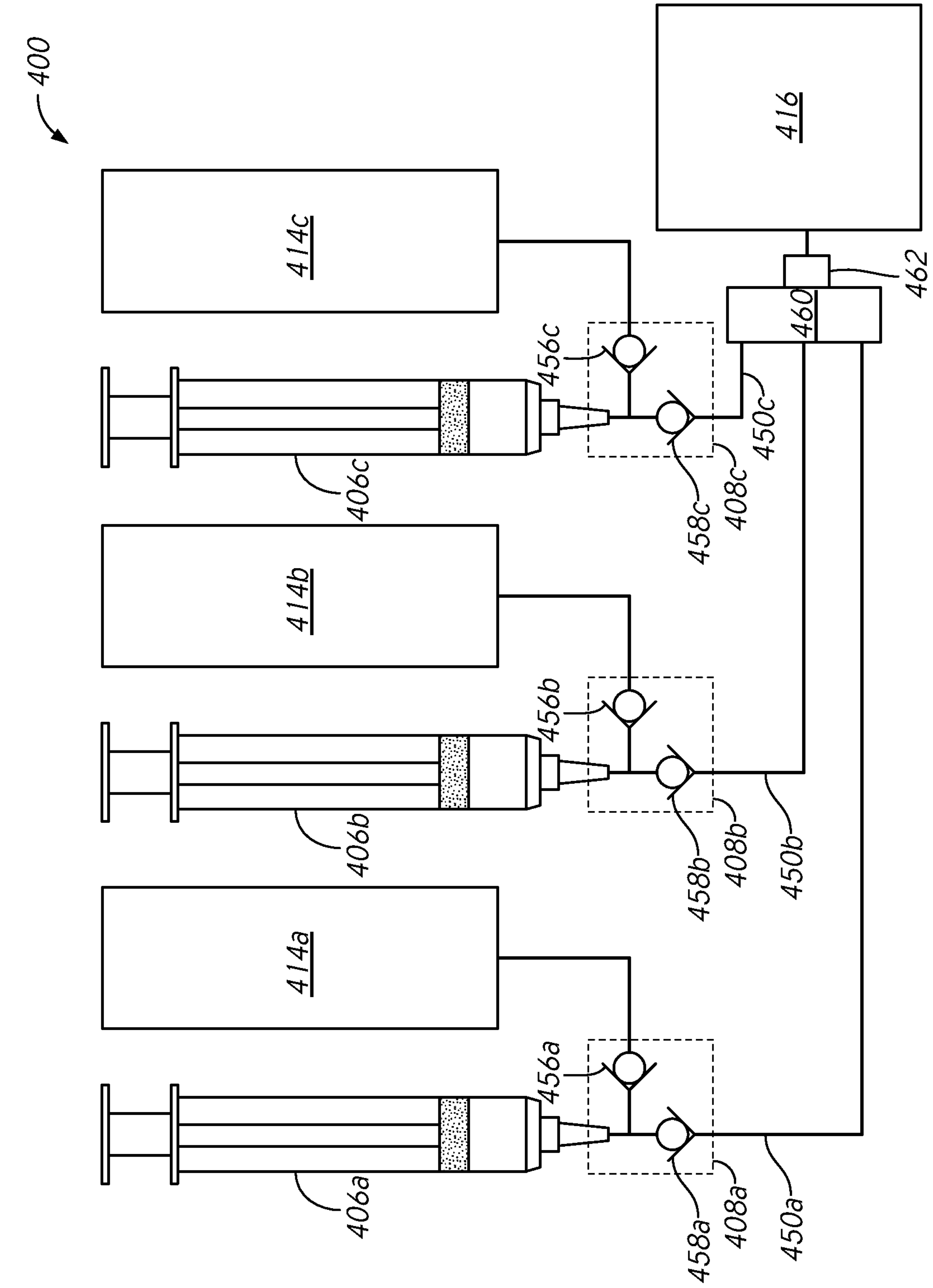
FIG. 4 schematically illustrates a multiple-source compounder which utilizes multiple syringe pumps to draw fluid from attached source containers and compound the drawn fluid in a target container.

FIG. 4 schematically illustrates a multiple-source compounder which utilizes multiple syringe pumps to draw fluid from attached source containers and compound the drawn fluid in a target container. The compounder 400 includes a plurality of source containers 414*a*, 414*b*, and 414*c*, each of which can contain a fluid such as a component solution of a TPN solution. In the illustrated embodiment, three source containers are shown, although in other embodiments, any suitable number of source containers can be used. Each of the source containers 414*a*, 414*b*, and 414*c* is in fluid communication, via a respective connector 408*a*, 408*b*, or 408*c*, with a respective intermediate measuring container such as one of syringe pumps 406*a*, 406*b*, or 406*c*. Any description or illustration of a syringe pump in this specification can alternatively be substituted or replaced with any other suitable type of medical pump, including but not limited to a peristaltic pump, an elastomeric pump, and/or a bladder pump.

In the illustrated embodiment, the connectors 408*a*, 408*b*, and 408*c* are two-way check valve connectors. In other embodiments, however, the intermediate measuring containers can include distinct inlet and outlet connectors, or any other suitable connectors.

In the illustrated embodiment, the intermediate measuring containers are syringe pumps 406*a*, 406*b*, and 406*c*, which can include a syringe which can be controlled by a linear actuation mechanism which engages a portion of the syringe to control the translation of the plunger within the syringe. The syringe pumps 406*a*, 406*b*, and 406*c* can be releasably coupled to a linear actuation mechanism via a driving component such as the actuator 332 of the transfer station 308*a* of FIG. 3.

In some embodiments, the driving component can be linearly translated through the use of a stepper motor which drives a ball screw nut to move the driving component, but a wide variety of other suitable mechanical linkages can be used in other embodiments. The driving component, or another connecting portion moveable along with the driving component, can engage a portion of the perfusion syringe to cause the plunger to be moved relative to the remainder of the perfusion syringe, increasing or decreasing the volume of the interior chamber defined by the syringe to operate one of the syringe pumps 406*a*, 406*b*, or 406*c*.

Fluid can be drawn from the source container 414*a* into the body of the syringe pump 406*a* by controlling the actuator mechanism of the syringe pump 406*a* to withdraw the plunger of the syringe pump 406*a*. A source check valve 456*a* is disposed within the connector 408*a* along the fluid path between the source container 414*a* and the syringe pump 406*a*. The source check valve 456*a* can include any suitable check valve, such as a duckbill check valve as illustrated in FIG. 6A, although in other embodiments, any other suitable check valve or one-way valve can be used. The source check valve 456*a* of the connector is oriented to permit fluid to be drawn from the source container 414*a* into the body of the syringe pump 406*a* when the syringe plunger is withdrawn, but prevent backflow from the syringe pump 406*a* into the source container 414*a* when the syringe plunger is depressed.

Once a desired amount of fluid has been drawn into the interior of the syringe pump 406*a*, the syringe plunger may be depressed by linearly translating the driving component in the opposite direction to reduce the volume of the interior of the syringe pump 406*a*, forcing fluid out of the syringe pump 406*a*. The fluid is prevented from backflowing into the source container 414*a* by the orientation of source check valve 456*a*, but permitted to flow through the target check valve 458*a* due to the opposite orientation of the target check valve 458*a*. After passing through the target check valve 458*a*, the fluid flows through outlet line 450*a* towards a mixing manifold 460 in fluid communication with each of outlet lines 450*a*, 450*b*, and 450*c*.

The mixing manifold 460 may be removably placed, via manifold connector 462, in fluid communication with a target container 416 via a luer connection or any other suitable mechanical connection which allows the target container 416, or a length of tubing extending therefrom, to be releasably connected to the manifold connector 462. A luer connection such as the manifold connector 462, downstream of the manifold 460, can have a smaller bore than the surrounding tubing, and may function as an overall bottleneck to the compounder system 400.

A wide variety of connector designs can be used to control the fluid exchange between the source containers, the syringe pumps, and the outlet lines. For example, the connector system can include one or more one-way valves placed in appropriate locations in fluid communication respectively with a source container, a syringe pump, and an outlet line. Flow of fluid and air throughout the connector can be constrained through a plurality of check valves disposed throughout the connector.

As shown in FIG. 4, a plurality of output lines such as outlet lines 450*a*, 450*b*, and 450*c* flow into the manifold 460. A flow constraining component downstream of the manifold 460, such as a luer manifold connection 462 or another component downstream of mixing manifold 460 of the compounder 400, may serve as a bottleneck for the compounder. If the flow rate of the compounded solution is constrained by the manifold connector 462 or another downstream component, the pressure within the system may increase, putting increased pressure on the target check valves 458*a*, 458*b*, and 458*c*. If the pressure exceeds a failure threshold of the target check valves 458*a*, 458*b*, and 458*c*, one or more of the target check valves 458*a*, 458*b*, and 458*c* may fail, allowing backflow from the adjacent output line back through the target check valve and towards the connected syringe pump.

For example, if operational pressure in one of the syringe pumps 406*a*, 406*b*, or 406*c* is sufficiently high, the downstream line pressure at or beyond the manifold connector 462 may cause failure of one or more of the target check valves 458*a*, 458*b*, and 458*c* connected to another syringe pump. Such a pressure increase may occur, for example, when the fluid being dispensed has a viscosity sufficiently high that the fluid cannot be freely dispensed at the rate at which the syringe plunger of the syringe pump is being depressed. In particular, components of a TPN solution, such as a lipid emulsion solution, may have a comparatively high viscosity in comparison to other pharmaceutical fluids.

This backflow can affect the current compounding process, causing less solution to be dispensed than intended, as some fluid can flow back into a syringe pump intended to be in an empty state. This backflow can also affect subsequent compounding processes, causing the backflowed solution to be dispensed in addition to the desired dispensed amount. Even if these errors are caught by other means, such as by measuring the weight of the dispensed fluid in the source container, this can result in wasted time and material if an additional compounding process is required to provide a replacement solution.

Such pressure spikes, and the corresponding backflow, can be minimized or prevented by constraining the rate at which fluid is dispensed from the syringe pumps. However, an overly cautious approach may result in unnecessarily limiting the overall speed of the compounding processes. Given sufficient experience, an operator can manually optimize the various dispensing channels for the particular fluids and solutions being dispensed therefrom. Such optimization is the result, however, of experience and trial and error. Incorporation of sensors into the perfusion syringes or other disposable components of the compounder to detect an overpressure condition or the resulting pressure-induced backflow or valve failure may increase the cost and complexity of the system.

In some embodiments, the operating conditions of a stepper motor driving a syringe pump may be monitored during operation of the syringe pump in order to obtain a measurement of the torque of the motor without the need for the inclusion of additional sensors.

Electric motors such as a stepper motor operate by generating rotating electromagnetic fields using stator coils. This allows precise control over the position and speed of the stepper motor. During operation of a stepper motor through the generation of a driving electromotive force (EMF), the rotation of the rotor relative to the stator coils generates a back EMF opposing the driving EMF. The back EMF is proportional to the angular velocity of the motor, and is affected by the load on the motor. When the motor is unloaded, the back EMF will be almost equal to the driving EMF, as the motor only needs to work to overcome friction. When driven with a sinusoidal signal, the load angle in an unloaded state will be almost zero. As the load increases, the back EMF will drop, and the load angle will shift as the power is required to overcome the load.

For a stepper motor with known or measured mechanical properties, such as a given torque constant, the measured back EMF voltage can be used in conjunction with the driving voltage to calculate the torque output of the motor. The measured torque being applied to a linear actuator, such as a ball screw nut, can be used to calculate the linear force applied by the linear actuator as a function of the application of the measured torque. In turn, the applied force can be used to calculate the pressure within a syringe pump based upon the dimensions of the syringe pump.

Figure 5:
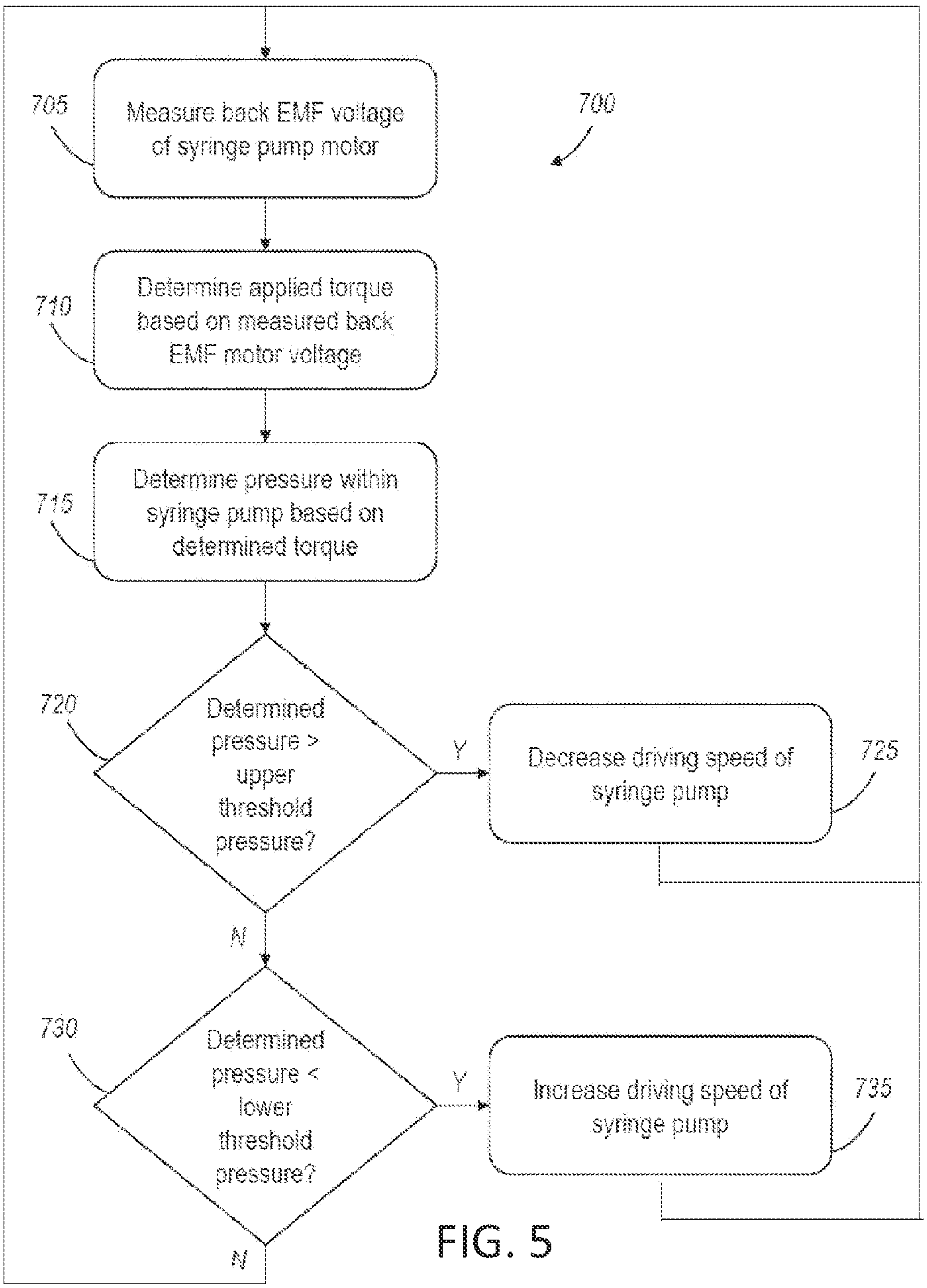
FIG. 5 is a flow diagram illustrating an example embodiment of a method 700 of calculating pressure in a syringe pump based upon a measured back EMF voltage.

FIG. 5 is a flow diagram illustrating an example embodiment of a method 700 of calculating pressure in a syringe pump based upon a measured back EMF voltage. At block 705, the back EMF voltage of an electric motor of a syringe pump is measured. In some embodiments, control circuitry of the electric motor can be used to output a signal indicative of the measured back EMF voltage. In some embodiments, such a back EMF voltage signal may be received over a wired or wireless connection by a controller of the syringe pump.

At block 710, the measured back EMF voltage or a received signal indicative of the measured back EMF voltage is used to determine the torque applied by the electric motor. In some embodiments, this calculation may be performed within the control circuitry of the electric motor, and the control circuity may output a signal indicative of the torque of the electric motor. In some embodiments, such a torque signal may be received over a wired or wireless connection by a controller of the syringe pump. In other embodiments, the controller may calculate the torque applied by the electric motor based on a received back EMF voltage signal. This calculation may be performed based on mechanical parameters of the motor, which may be inputted or programmed manually, provided in a lookup table, or may be determined through a calibration process, such as by driving the electric motor against a mechanical stop.

At block 715, the determined torque is used to determine the pressure within the syringe pump based upon the parameters of the syringe pump, such as the mechanical properties of the linear actuator and the cross-sectional size of the syringe. In some embodiments, the force applied by the linear actuator on the syringe plunger may be determined, e.g., based upon the dimensions of the ball screw nut or other cam structure of the linear actuator. The applied force may then be used to calculate the pressure within the syringe pump based upon the cross-sectional dimensions of the syringe.

As described with respect to FIG. 3, a bar code or other identifying information may be provided on a syringe to identify the syringe, and to provide information regarding the properties of the syringe. With the dimensions of the syringe known, such as the cross-sectional dimensions of the syringe interior, the linear displacement of the syringe plunger may be correlated to the corresponding volumetric change in the internal dimensions of the syringe. This allows the determination of the linear displacement of the plunger required to fill the syringe pump with a desired volume of fluid, and to dispense the same.

In some embodiments, the signal indicative of the back EMF may be used to directly determine the pressure within the syringe pump, and discrete intermediate steps of determination of torque being applied by the motor and/or the force being applied on the syringe plunger can be omitted. This determination of the pressure within the syringe may be performed periodically throughout the operation of the syringe. In particular, the pressure may be monitored when the syringe plunger is being depressed to expel fluid contained within the syringe through the target check valve and into the outlet line towards the mixing manifold.

At block 720, the determined pressure can be compared to at least one threshold pressure. In some embodiments, the comparison may be only to an upper pressure threshold. If the determined pressure within the syringe exceeds the upper pressure threshold, the process may move to a block 725, where the driving speed of the syringe pump may be lowered, as discussed in greater detail below. If the determined pressure remains below the upper threshold pressure, the driving speed of the syringe pump may be left at its current speed, and the process may optionally return to block 705 and periodically repeat the process 700 during operation of the syringe pump.

In some embodiments, the process may move to a block 730, where the determined pressure may optionally be compared to a lower pressure threshold. In some embodiments, the lower pressure threshold may be less than the upper pressure threshold, while in other embodiments, the lower pressure threshold may be equal to the upper pressure threshold. If the determined pressure remains above the lower threshold pressure, in addition to remaining below the upper threshold pressure, the driving speed of the syringe pump may be left at its current speed, and the process may optionally return to block 705 and periodically repeat the process 700 during operation of the syringe pump. If the determined pressure is below the lower threshold pressure, a determination can be made that the syringe pump could operate at a higher driving speed without generation of a pressure spike which would impact the operation of the compounder. The process may optionally move to a block 735, where the driving speed of the syringe pump may be increased, as discussed in greater detail below.

If the process moves to block 720 or 730, an appropriate adjustment to the driving speed of the syringe plunger may be made. In some embodiments, the driving speed may be adjusted by a predetermined increment or percentage, or adjusted between one of a number of predetermined speeds. In some embodiments, the speed adjustment may be based at least in part on the magnitude of the difference between the determined pressure and the threshold pressure, with larger adjustments being made when the determined pressure is significantly different beyond the threshold pressure to which it is compared. As discussed in greater detail below, the speed adjustments may also be based at least in part on the operational state and determined pressure of other syringe pumps. In some embodiments, sufficiently large pressure differentials may trigger an error state due to possible clogs or blockage within the compounder system.

As described above, an experienced operator may, through trial and error, develop knowledge of suitable operating speeds for various source solutions, allowing the hand optimization of the operating speed of the various syringe pumps. However, if the viscosity of a given source solution is unknown, or is different than anticipated for any reason, an operator may in some instances default to a slower operating speed than necessary, as a precautionary measure which reduces the overall throughput of the compounder. Alternately, the operator may set the operating speed too high, and cause compounding errors due to pressure spikes which result in overall waste and delay.

In some embodiments, the pressure at another location in the compounding system may be estimated based on the determined pressure within one or more syringe pumps. For example, an average of the determined pressures within the operating syringe pumps may be used as an estimate of the pressure at a downstream location such as a manifold connector.

Figure 6:
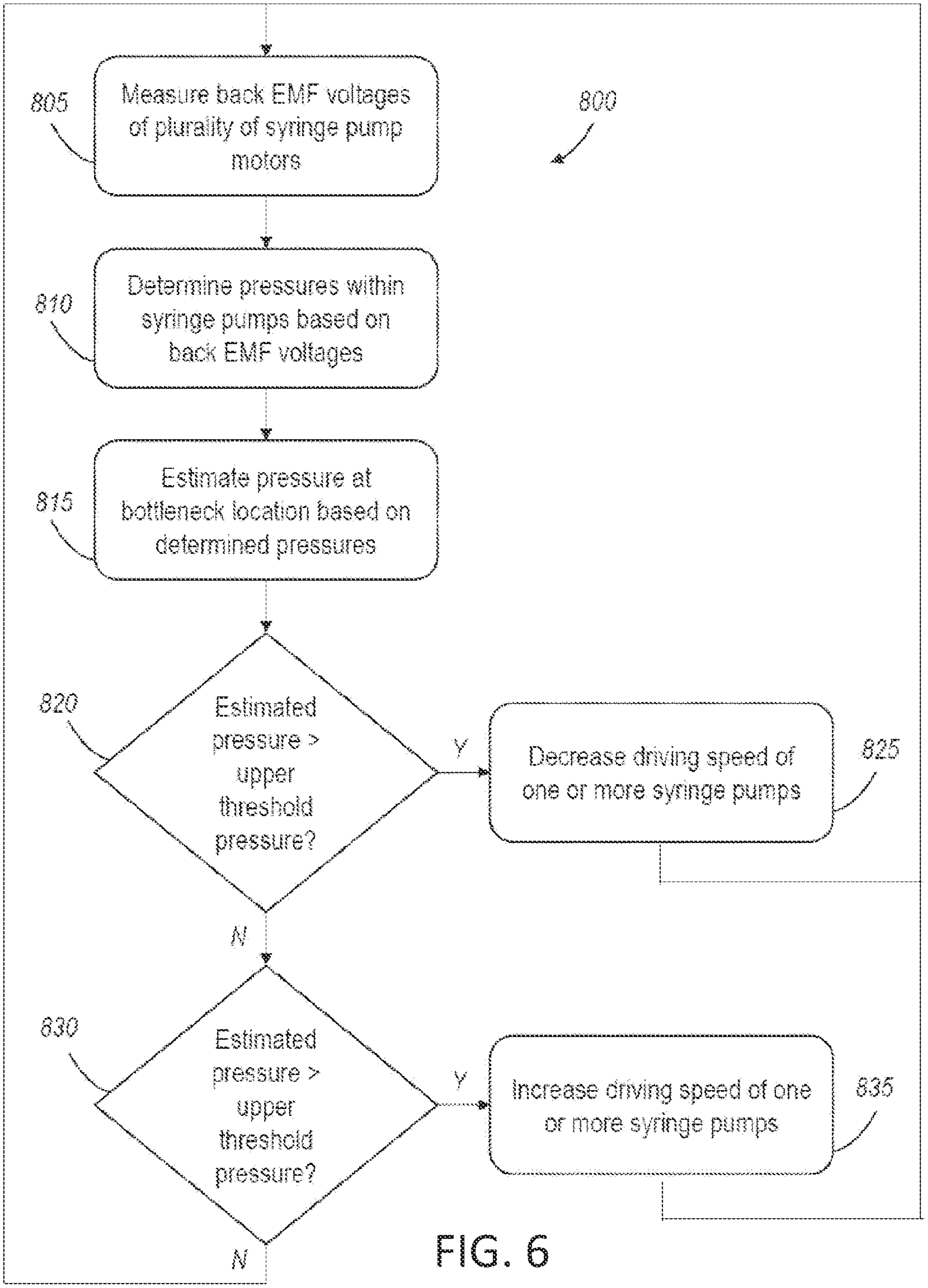
FIG. 6 is a flow diagram illustrating an example embodiment of a method 800 of estimating an operating pressure of a compounder comprising a plurality of syringe pumps based upon measured back EMF voltages.

FIG. 6 is a flow diagram illustrating an example embodiment of a method 800 of estimating an operating pressure of a compounder comprising a plurality of syringe pumps based upon measured back EMF voltages. At block 805, the back EMF voltages of the electric motors of a plurality of syringe pumps are measured. These back EMF voltages can be measured substantially simultaneously, although in other embodiments periodic staggered measurements may also be made, depending on the length of the sampling cycle.

At block 810, the pressures within each of the plurality of syringe pumps are determined based upon received signals indicative of the measured back EMF voltages. As discussed with respect to FIG. 7, this determination can in some embodiments include a discrete intermediate step of determining the torque being applied by the motor and/or the force being applied to the syringe plunger. In some embodiments, the pressure can be directly determined from the measured back EMF voltage based at least in part upon the dimensions of the syringe.

At block 815, the pressure at a manifold luer connector or other bottleneck downstream of the syringe pumps may be estimated based at least in part on the determined pressures within a plurality of syringe pumps. In some embodiments, this estimate may be an average of the determined pressures within the plurality of syringe pumps currently dispensing fluid into the outlet lines. In other embodiments, the estimate may also be based at least in part on the dimensions or other characteristics of the syringe pumps and/or other components of the compounder system.

The estimated pressure can, like the determined pressure within the syringes, be compared to upper and/or lower threshold pressures in respective blocks 820 and 830, and the results of that comparison used to control or adjust the operation of one or more of the syringe pumps of the compounder. If the estimated pressure exceeds an upper threshold pressure, the process may move to a block 825 where the driving speeds of one or more syringe pumps are decreased. If the estimated pressure is below a threshold pressure, which may be different than the upper threshold pressure, the process may move to a block 835 where the driving speeds of one or more syringe pumps are increased. These adjustments can change, improve, modify, and/or optimize the dispensing routine to avoid overpressure situations while increasing where possible the dispensing rates of certain component fluids.

In an embodiment in which multiple syringe pumps are simultaneously operating, the operating parameters of the various syringe pumps may be changed, improved, modified, and/or optimized to reduce the overall compounding time for a given compounding process while avoiding overpressure events which can cause backflow and/or valve damage. In some embodiments, dispensing parameters for a given mixture may be adjusted or optimized based upon back EMF voltage measurements of a plurality of syringe pumps. The use of back EMF voltage measurements provides a method of monitoring and optimizing a compounding process that is sensorless or that lacks a sensor independent from a measurement of the EMF voltage. This monitoring and optimization can be accomplished without requiring modifications to or increases in the cost of disposable components, such as the disposable syringes of the syringe pumps.

Figure 7:
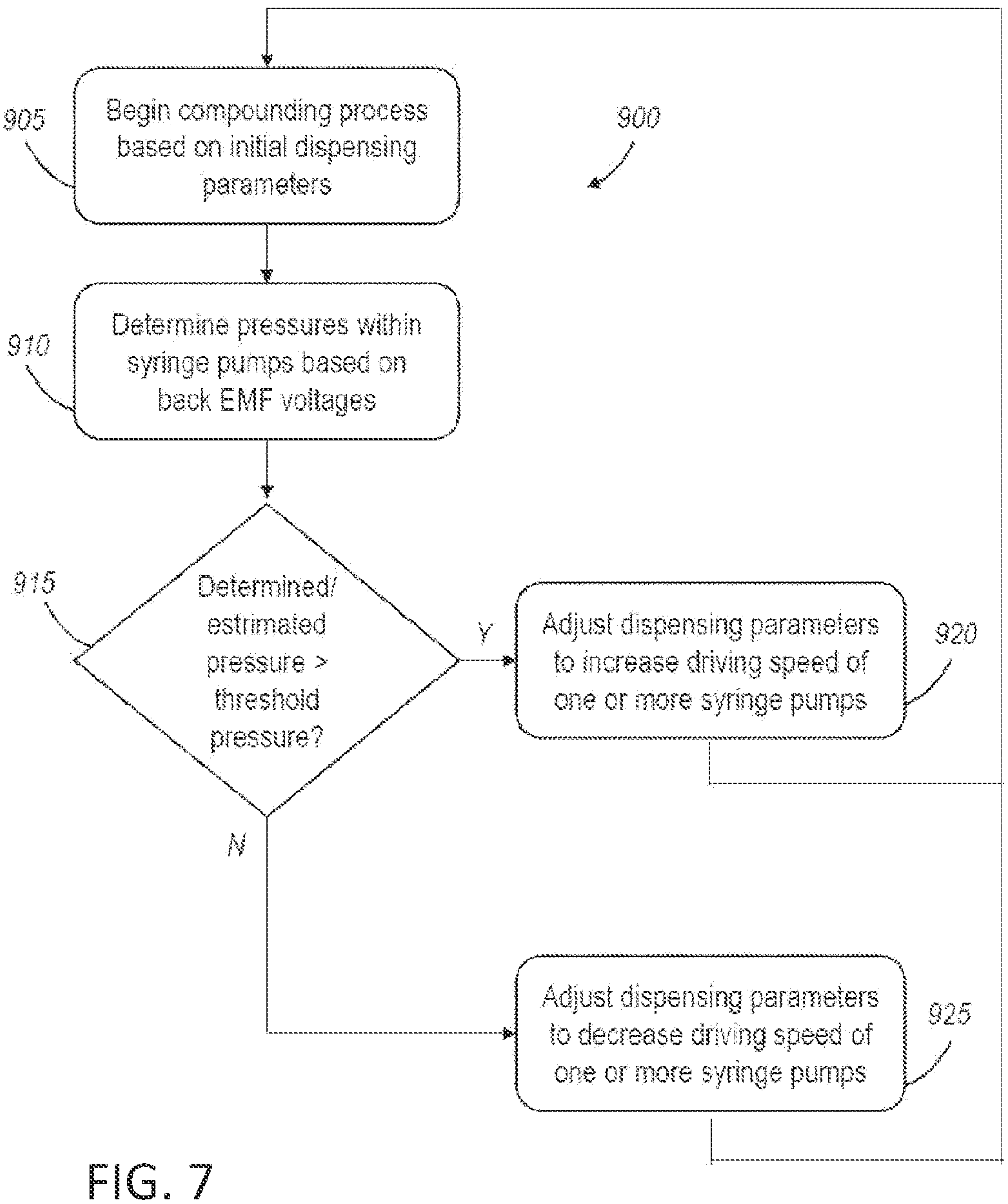
FIG. 7 is a flow diagram illustrating an example embodiment of a method 900 of adjusting dispensing parameters for a compounding process based at least in part on measured back EMF voltages from a plurality of syringe pumps.

FIG. 7 is a flow diagram illustrating an example embodiment of a method 900 of adjusting dispensing parameters for a compounding process based at least in part on measured back EMF voltages from a plurality of syringe pumps. At block 905, a compounding process begins, the compounding process including dispensation of fluids from a plurality of source containers into a single target container using a plurality of syringe pumps. The dispensing parameters for compounding process can include both a total amount of each component solution to be dispensed, as well as a rate parameter controlling the speed at which the fluid in a given channel is dispensed. For example, the rate parameter may include a gravimetric or volumetric rate at which a given component solution is to be dispensed, and may include an actuator speed such as an angular velocity of a driving stepper motor or other rotary motor, or a linear rate at which a ball nut screw or other linear actuator drives a syringe plunger. In other embodiments, the dispensing parameters may be defined, for example, through an actuator speed and actuation duration.

In some embodiments, the dispensing parameters may be calculated by a controller of the compounder based on information regarding a prescribed target compound and source fluids or solutions to be compounded. In some embodiments, information regarding the prescribed target compound and/or the source solutions may be manually input by an operator. In other embodiments, information regarding the prescribed target component and/or the source solutions may be electronically retrieved, such as from a database. The initial dispensing parameters may be adjusted by an operator prior to initiation of the compounding process.

At block 910, the pressures within the syringe pumps currently dispensing fluid into the outlet lines are determined based at least in part on measured back EMF voltages of the motors driving the syringe pumps. In some embodiments, the determined pressures within the individual active syringe pumps are also used to estimate a pressure elsewhere within the compounder system, such as at or downstream of a mixing manifold, where a luer connector or other component can serve as a bottleneck.

At block 915 the determined and/or estimated pressure measurements are compared to one or more pressure threshold values. This comparison can be done to determine, for example, whether the initial dispensing parameters run a risk of an overpressure condition which could impact the operation of the compounding process. This comparison can also be done, however, to determine whether the current dispensing parameters can be safely adjusted to optimize the compounding process, such as by reducing the time remaining in the dispensing process.

If the determined and/or estimated pressure measurements exceed a pressure threshold value, the process moves to a block 920 where one or more of the initial dispensing parameters can be adjusted to reduce or eliminate a risk of an overpressure condition. In some embodiments, the dispensing conditions may be adjusted to reduce a risk of an overpressure condition, such as by reducing the flow rate of the syringe pumps with the highest determined pressure. In other embodiments, however, the dispensing conditions may be adjusted to optimize the compounding process while reducing the estimated pressure at a bottleneck location within the system, or maintaining the estimated pressure at a bottleneck location below a desired threshold value.

In such an embodiment, a remaining amount of a given source solution to be transferred may be taken into account in adjusting the dispensing parameters. Priority may be given to maintaining a high flow rate for the channels which have the largest volumes of fluid remaining to be dispensed, or with the largest amount of time remaining for active operation of a syringe. In some embodiments, the flow rate may be maintained at a high level even if the determined pressure within the syringe pumps for those channels is higher than the syringe pumps for other channels with less volume remaining to be dispensed. A reduction in flow rate of other channels with less remaining volume to be dispensed may reduce the overall estimated pressure at a bottleneck location within the compounder output tubing. This reduction in estimated pressure can allow for the maintenance of higher flow rate of, for example, a more viscous source solution with a large amount of remaining volume to be dispensed, by reducing the flow rate of one or more less viscous source solutions with smaller amounts of remaining volume to be dispensed.

If the determined and/or estimated pressure measurements do not exceed the pressure threshold value, the process can move to a block 925 where one or more of the initial dispensing parameters can be adjusted to optimize the compounding process. The remaining amount of source solution to be transferred via each of the channels of the compounder in use may be taken into account, and the flow rate adjusted upwards in channels which have the largest volume of fluid remaining to be dispensed. The process can return to the block 910, where the pressures within the syringe pumps currently dispensing fluid into the outlet lines are determined based at least in part on measured back EMF voltages of the motors driving the syringe pumps using the updated dispensing parameters. The dispensing parameters can be iteratively updated in this manner to arrive at an optimized set of dispensing parameters while monitoring the determined and/or estimated pressure measurements to avoid overpressure conditions.

By prioritizing the dispensing of the source solutions with the largest amounts of volume remaining to be dispensed, the overall dispensing time of the compounding process can be reduced, while the determined and/or estimated pressure measurements within the syringe pumps and elsewhere within the compounder output tubing can be continually monitored during an iterative adjustment process in a manner which does not require the inclusion of dedicated pressure sensors within portions of the compounder system, such as the syringes and tubing, which may be disposable.

Using a method such as the sensorless iterative method 900, an optimized set of dispensing parameters may be determined starting from a baseline default set of dispensing parameters which does not require any knowledge of the viscosity of the particular source solutions being used in a given recipe. In other embodiments, however, the initial dispensing parameters need not be a default baseline, but may be manually or automatically adjusted based on information regarding the source solutions or based on the experience of the operator, and may be further optimized using an iterative process such as the processes described herein. If such adjusted initial dispensing parameters may lead to an overpressure event, the monitoring of the pressures within the compounder can quickly identify and correct for the risk of an overpressure event.

Although many features of the embodiments shown in the Figures are specifically called out and described, it will be understood that additional features, dimensions, proportions, relational positions of elements, etc. shown in the drawings are intended to make up a part of this disclosure even when not specifically called out or described. Although forming part of the disclosure, it will also be understood that the specific dimensions, proportions, relational positions of elements, etc. can be varied from those shown in the illustrated embodiments.

Embodiments have been described in connection with the accompanying drawings. However, it should be understood that the foregoing embodiments have been described at a level of detail to allow one of ordinary skill in the art to make and use the devices, systems, etc. described herein. A wide variety of variation is possible. Components, elements, and/or steps may be altered, added, removed, or rearranged. Additionally, processing steps may be added, removed, or reordered. While certain embodiments have been explicitly described, other embodiments will also be apparent to those of ordinary skill in the art based on this disclosure.

Some aspects of the systems and methods described herein can advantageously be implemented using, for example, computer software, hardware, firmware, or any combination of software, hardware, and firmware. Software can comprise computer executable code for performing the functions described herein. In some embodiments, computer-executable code is executed by one or more general purpose computers. However, a skilled artisan will appreciate, in light of this disclosure, that any module that can be implemented using software to be executed on a general purpose computer can also be implemented using a different combination of hardware, software, or firmware. For example, such a module can be implemented completely in hardware using a combination of integrated circuits. Alternatively or additionally, such a module can be implemented completely or partially using specialized computers designed to perform the particular functions described herein rather than by general purpose computers.

While certain embodiments have been explicitly described, other embodiments will become apparent to those of ordinary skill in the art based on this disclosure. Therefore, the scope of the invention is intended to be defined by reference to the claims as ultimately published in one or more publications or issued in one or more patents and not simply with regard to the explicitly described embodiments.

The following is claimed:

1. An electronically controlled compounding system configured to transfer fluids from a plurality of source containers to a target container, the system comprising:

a plurality of fluid transfer stations, each of the plurality of fluid transfer stations comprising:

an electric motor; and a pump functionally connected to the electric motor, the pump actuatable via the electric motor to transfer fluid between a source container and an outlet line in fluid communication with the pump;

a mixing manifold in fluid communication with the outlet lines of each of the plurality of fluid transfer stations, the mixing manifold comprising an outlet connector configured to be placed in fluid communication with a target container; and an electronic controller configured to receive information from each of the plurality of electric motors indicative of a measured back electromotive force (EMF) voltage during operation of the electric motors and to control the operation of the plurality of electric motors based at least in part on the received information indicative of the measured back EMF voltages.

2. The system of claim 1, wherein one or more pumps of the plurality of fluid transfer stations is a syringe pump.

3. The system of claim 2, wherein the electronic controller is configured to determine a pressure within the syringe pumps of each of the plurality of fluid transfer stations based at least in part on the received information indicative of the measured back EMF voltage of the electric motor of the fluid transfer station.

4. The system of claim 3, wherein the electronic controller is configured to control the operation of an electronic motor based at least in part on the determined pressure within the syringe pump functionally connected to the electric motor.

5. The system of claim 3, wherein the electronic controller is configured to estimate a pressure at the outlet connector of the mixing manifold based at least in part on the determined pressures within the plurality of syringe pumps.

6. The system of claim 1, wherein one or more pumps of the plurality of fluid transfer stations is a peristaltic pump.

7. The system of claim 1, wherein the electric motor comprises control circuity configured to measure the back EMF voltage during operation of the electric motor and transmit an output signal indicative of the back EMF voltage.

8. The system of claim 1, wherein each of the plurality of fluid transfer stations additionally comprises:

a source check valve disposed between the pump of the fluid transfer station and a source inlet configured to be placed in fluid communication with a source container; and a target check valve disposed between the pump of the fluid transfer station and the outlet line.

9. The system of claim 8, wherein each of the plurality of fluid transfer stations additionally comprises a connector configured to place the pump of the fluid transfer station in fluid communication with the outlet line and the source container, and wherein each of the source check valve and the target check valve are disposed within the connector.

10. The system of claim 3, wherein the electronic controller is configured to compare the determined pressure within the syringe pumps of each of the plurality of fluid transfer stations to a threshold pressure in order to identify an overpressure condition.

11. An electronically controlled compounding system configured to compound fluids drawn from a plurality of source containers in desired proportions in a destination container, the system comprising:

a plurality of syringe pumps, each syringe pump of the plurality of syringe pumps comprising a plunger movable relative to a body of the syringe pump;

a plurality of motors, each of the plurality of motors being configured to control the position of a linear actuator mechanism configured to be connected to one of the plurality of syringe pumps to control the position of the plunger of the syringe pump; and an electronic controller configured to control the operation of each of the plurality of motors to cause the plurality of syringe pumps to dispense fluids drawn from a plurality of source containers in desired proportions into a destination container, the electronic controller configured to receive information from each of the plurality of motors regarding a back electromotive force (EMF) voltage of the motor and control the operation of each of the plurality of motors based at least in part on the received information regarding the back EMF voltages of the plurality of motors.

12. The system of claim 11, wherein the system further comprises:

a plurality of outlet lines, each of the plurality of outlet lines in fluid communication with one of the plurality of syringe pumps via a destination check valve; and a manifold connector in fluid communication with each of the plurality of outlet lines, wherein the controller is configured to estimate a pressure at the manifold connector based at least in part on the received information regarding the back EMF voltages of the plurality of motors.

13. The system of claim 12, wherein the electronic controller is configured to:

determine the pressure in each of the syringe pumps based at least in part on the information regarding the back EMF voltages of the plurality of motors; and estimate the pressure at the manifold connector based at least in part on the determined pressure in each of the syringe pumps.

14. The system of claim 12, wherein the electronic controller is configured to control the operation of the plurality of motors based on a set of dispensing parameters, and wherein the electronic controller is configured to update the set of dispensing parameters based at least in part on the estimated pressure at the manifold connector.

15. The system of claim 14, wherein the electronic controller is configured to update the set of dispensing parameters to reduce a completion time of a compounding process while maintaining the estimated pressure at the manifold connector below a threshold pressure.

16. A method of adjusting dispensing parameters of a multichannel compounder, the method comprising:

beginning a compounding process to combine fluids dispensed from a plurality of source containers into a single target container using a plurality of syringe pumps, each syringe pump in fluid communication with a mixing manifold and one of the plurality of source containers, each of the plurality of syringe pumps comprising a driving motor, the driving motors being controlled according to an initial set of driving parameters;

during the compounding process, determining pressures within each of the plurality of syringe pumps based on a measured back electromotive force (EMF) voltage; and during the compounding process, updating the initial set of driving parameters based at least in part on the determined pressure within each of the plurality of syringe pumps.

17. The method of claim 16, wherein updating the initial set of driving parameters comprises reducing a driving speed of at least one of the plurality of syringe pumps.

18. The method of claim 17, wherein reducing a driving speed of at least one of the plurality of syringe pumps comprises reducing a driving speed of a syringe pump having the highest determined pressure of the plurality of syringe pumps.

19. The method of claim 16, wherein updating the initial set of driving parameters comprises increasing a driving speed of at least one of the plurality of syringe pumps.

20. The method of claim 19, wherein increasing a driving speed of at least one of the plurality of syringe pumps comprises increasing a driving speed of a syringe pump having the largest remaining amount of fluid to be dispensed.

* * * * *